United States Patent
Hanada

(10) Patent No.: US 9,054,613 B2
(45) Date of Patent: Jun. 9, 2015

(54) MOTOR DRIVE APPARATUS AND VEHICLE WITH THE SAME MOUNTED THEREON

(75) Inventor: Hideto Hanada, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 93 days.

(21) Appl. No.: 13/699,186

(22) PCT Filed: Jun. 25, 2010

(86) PCT No.: PCT/JP2010/060842
§ 371 (c)(1),
(2), (4) Date: Nov. 20, 2012

(87) PCT Pub. No.: WO2011/161811
PCT Pub. Date: Dec. 29, 2011

(65) Prior Publication Data
US 2013/0063061 A1   Mar. 14, 2013

(51) Int. Cl.
*H02P 23/12* (2006.01)
*H02K 5/00* (2006.01)
*H02P 6/14* (2006.01)
*H02P 27/08* (2006.01)
*H02P 29/00* (2006.01)

(52) U.S. Cl.
CPC ............... *H02P 6/145* (2013.01); *H02P 27/08* (2013.01); *H02P 29/0066* (2013.01)

(58) Field of Classification Search
CPC .............................. H02P 27/08; H02P 29/0066
USPC .......................... 318/400.14, 400.13, 400.02; 310/156.27
See application file for complete search history.

(56) References Cited

U.S. PATENT DOCUMENTS

| 5,757,152 A | * | 5/1998 | Yuem ..................... 318/400.13 |
| 2007/0120520 A1 | | 5/2007 | Miyazaki et al. |
| 2007/0175429 A1 | | 8/2007 | Yanagida et al. |
| 2007/0205041 A1 | * | 9/2007 | Nishizaki et al. ............ 180/446 |
| 2009/0026988 A1 | * | 1/2009 | Tomigashi ............... 318/400.02 |
| 2009/0066360 A1 | | 3/2009 | Kunzel |
| 2009/0128076 A1 | | 5/2009 | Taniguchi |
| 2010/0148711 A1 | * | 6/2010 | Tadano ..................... 318/400.14 |
| 2010/0193267 A1 | | 8/2010 | Nozawa |

FOREIGN PATENT DOCUMENTS

| CN | 1030674 A | 1/1989 |
| CN | 100536316 C | 9/2009 |
| CN | 101755384 A | 6/2010 |
| JP | 9-056165 A | 2/1997 |
| JP | 09-275696 A | 10/1997 |
| JP | 2007-203817 A | 8/2007 |

(Continued)

Primary Examiner — Bentsu Ro
Assistant Examiner — Zemenay Truneh
(74) Attorney, Agent, or Firm — Sughrue Mion, PLLC

(57) ABSTRACT

A motor drive apparatus drives a motor generator using electric power provided from a DC power supply. The motor generator rotates a rotor provided with a permanent magnet using a current magnetic field generated by passing a drive current through a coil of a stator. The motor drive apparatus includes an inverter configured to convert DC electric power provided from the DC power supply into AC electric power for driving the motor generator. An ECU of the motor drive apparatus controls the inverter such that an offset current is superimposed on at least one phase of the coil of the stator and a temperature of the permanent magnet provided at the rotor is raised.

11 Claims, 14 Drawing Sheets

(56) References Cited

FOREIGN PATENT DOCUMENTS

| JP | 2008-043094 A | 2/2008 |
| JP | 2008-236923 A | 10/2008 |
| JP | 2009-189181 A | 8/2009 |
| WO | 8808636 | 11/1988 |

* cited by examiner

MOTOR DRIVE APPARATUS AND VEHICLE WITH THE SAME MOUNTED THEREON

CROSS REFERENCE TO RELATED APPLICATIONS

This application is a National Stage of International Application No. PCT/JP2010/060842, filed on Jun. 25, 2010, the contents of all of which are incorporated herein by reference in their entirety.

TECHNICAL FIELD

The present invention relates to a motor drive apparatus and a vehicle with the same mounted thereon, and more particularly to control over raising the temperature of a permanent magnet when an AC motor having a rotor provided with the magnet is driven.

BACKGROUND ART

In recent years, a vehicle that has a power storage device (e.g., a secondary battery, a capacitor and the like) mounted thereon and runs using driving force generated from electric power stored in the power storage device has received attention as an environmentally-friendly vehicle. This vehicle includes, for example, an electric vehicle, a hybrid vehicle, a fuel cell vehicle and the like.

In the above-mentioned vehicle, an inverter is generally used to convert DC electric power provided from the power storage device into AC electric power for driving a rotating electric machine such as a motor generator. Then, driving force generated by the rotating electric machine is used to cause the vehicle to run. During regenerative braking, rotational force provided from a driving wheel, an engine and the like is converted into electrical energy to charge the power storage device.

From the viewpoints of densification of field magnetic flux, ease of electric power regeneration and the like, a permanent magnet-type synchronous motor in which a permanent magnet is embedded in a rotor is used in some cases as the above-mentioned rotating electric machine mounted on the vehicle. Generally, the permanent magnet is known to change its properties depending on the ambient temperature. For example, in low ambient temperature, the magnetic flux density of the permanent magnet increases. As a result, at the time of low temperature, the counter-electromotive voltage generated by rotation of the rotating electric machine increases.

Japanese Patent Laying-Open No. 2008-043094 (PTL 1) discloses the technique of, in a vehicle including a motor generator having a rotor provided with a permanent magnet, determining a direct axis (d axis) current target value such that the direct axis current target value changes temporally, as well as setting a horizontal axis (q axis) current target value to zero and raising the temperature of the permanent magnet with the vehicle maintained at a stopped state, when the temperature of the permanent magnet is lower than a prescribed temperature at the start of operation.

CITATION LIST

Patent Literature

PTL 1: Japanese Patent Laying-Open No. 2008-043094
PTL 2: Japanese Patent Laying-Open No. 9-275696
PTL 3: Japanese Patent Laying-Open No. 2009-189181

SUMMARY OF INVENTION

Technical Problem

As described above, in the motor having the rotor provided with the permanent magnet, the magnetic flux density of the permanent magnet increases, and thus, the counter-electromotive voltage generated during rotation increases at the time of low temperature. Therefore, the inverter and the like driving the motor must be designed in consideration of this counter-electromotive voltage at the time of low temperature.

On the other hand, elements such as a switching element and a capacitor included in the inverter and the like must be designed to be capable of enduring the counter-electromotive voltage of the motor. Therefore, if the elements are designed in consideration of the low temperature, a withstand voltage design that is excessive for the normal operating temperature range is applied to protect these elements, which leads to an increase in cost.

In order to solve this problem, in Japanese Patent Laying-Open No. 2008-043094 (PTL 1) described above, at the start of operation of the vehicle in the low-temperature environment, the temperature of the permanent magnet is raised by passing only the d axis current of the motor, thereby reducing the counter-electromotive voltage of the motor.

In the technique disclosed in Japanese Patent Laying-Open No. 2008-043094 (PTL 1), however, running of the vehicle may be restricted until the temperature of the permanent magnet is raised to the prescribed temperature. In addition, when the motor rotation speed is low, the counter-electromotive voltage is low even in the low-temperature environment, and thus, raising the temperature of the permanent magnet is not always necessary. This is not, however, taken into consideration in Japanese Patent Laying-Open No. 2008-043094 (PTL 1), and unnecessary application of a current may result in wasteful consumption of electric power.

The present invention has been made to solve the above-mentioned problems and an object of the present invention is to, in the drive apparatus for the AC motor having the rotor provided with the permanent magnet, efficiently raise the temperature of the permanent magnet in the motor when the vehicle runs in the low-temperature environment, thereby making it possible to reduce an increase in the counter-electromotive voltage of the motor, to keep down cost, and to protect the components.

Solution to Problem

A motor drive apparatus according to the present invention drives an AC motor using electric power provided from a DC power supply. The AC motor rotates a rotor provided with a permanent magnet using a current magnetic field generated by passing a drive current through a coil of a stator. The motor drive apparatus includes: a power conversion device configured to convert DC electric power provided from the DC power supply into AC electric power for driving the AC motor; and a control device for controlling the power conversion device such that an offset current is superimposed on at least one phase of the coil of the AC motor and a temperature of the permanent magnet is raised.

Preferably, the control device changes magnitude of the offset current in accordance with a rotation speed of the AC motor.

Preferably, the control device controls the power conversion device such that the offset current increases as the rotation speed becomes higher.

Preferably, the control device sets the magnitude of the offset current in proportional to the rotation speed.

Preferably, the control device increases the offset current in a stepwise manner as the rotation speed increases.

Preferably, the control device sets the magnitude of the offset current using a map predetermined based on the rotation speed.

Preferably, the control device stops superimposition of the offset current when the rotation speed is lower than a reference rotation speed.

Preferably, the control device executes superimposition of the offset current when a temperature related to the permanent magnet is lower than a reference value at the start of driving of the AC motor, and does not execute superimposition of the offset current when the temperature related to the permanent magnet is higher than the reference value.

Preferably, the control device has a map defining a temporal change in temperature rise of the permanent magnet based on a driving state of the AC motor, estimates the temperature of the permanent magnet by calculating a value of the temperature rise of the permanent magnet using the map based on a torque command value and a rotation speed of the AC motor, and summing the calculated values of the temperature rise in a time axis direction since the start of driving of the AC motor, and stops superimposition of the offset current when the estimated temperature of the permanent magnet reaches a threshold value.

Preferably, the power conversion device includes an inverter configured to include a switching element and making power conversion by controlling the switching element in accordance with pulse width modulation control. The control device sets a frequency of a carrier wave used in the pulse width modulation control to be relatively lower when the temperature of the permanent magnet is lower than a reference temperature than when the temperature of the permanent magnet is higher than the reference temperature.

A vehicle according to the present invention includes: a DC power supply; an AC motor; a power conversion device; and a control device. The AC motor rotates a rotor provided with a permanent magnet using a current magnetic field generated by passing a drive current through a coil of a stator and generates driving force for causing the vehicle to run. The power conversion device converts electric power provided from the DC power supply into AC electric power for driving the AC motor. The control device controls the power conversion device such that an offset current is superimposed on at least one phase of the coil of the AC motor and a temperature of the permanent magnet is raised.

Advantageous Effects of Invention

According to the present invention, in the drive apparatus for the AC motor having the rotor provided with the permanent magnet, the temperature of the permanent magnet in the motor is efficiently raised when the vehicle runs in the low-temperature environment, thereby making it possible to reduce an increase in the counter-electromotive voltage of the motor, to keep down cost, and to protect the components.

DESCRIPTION OF EMBODIMENTS

Figure 1:
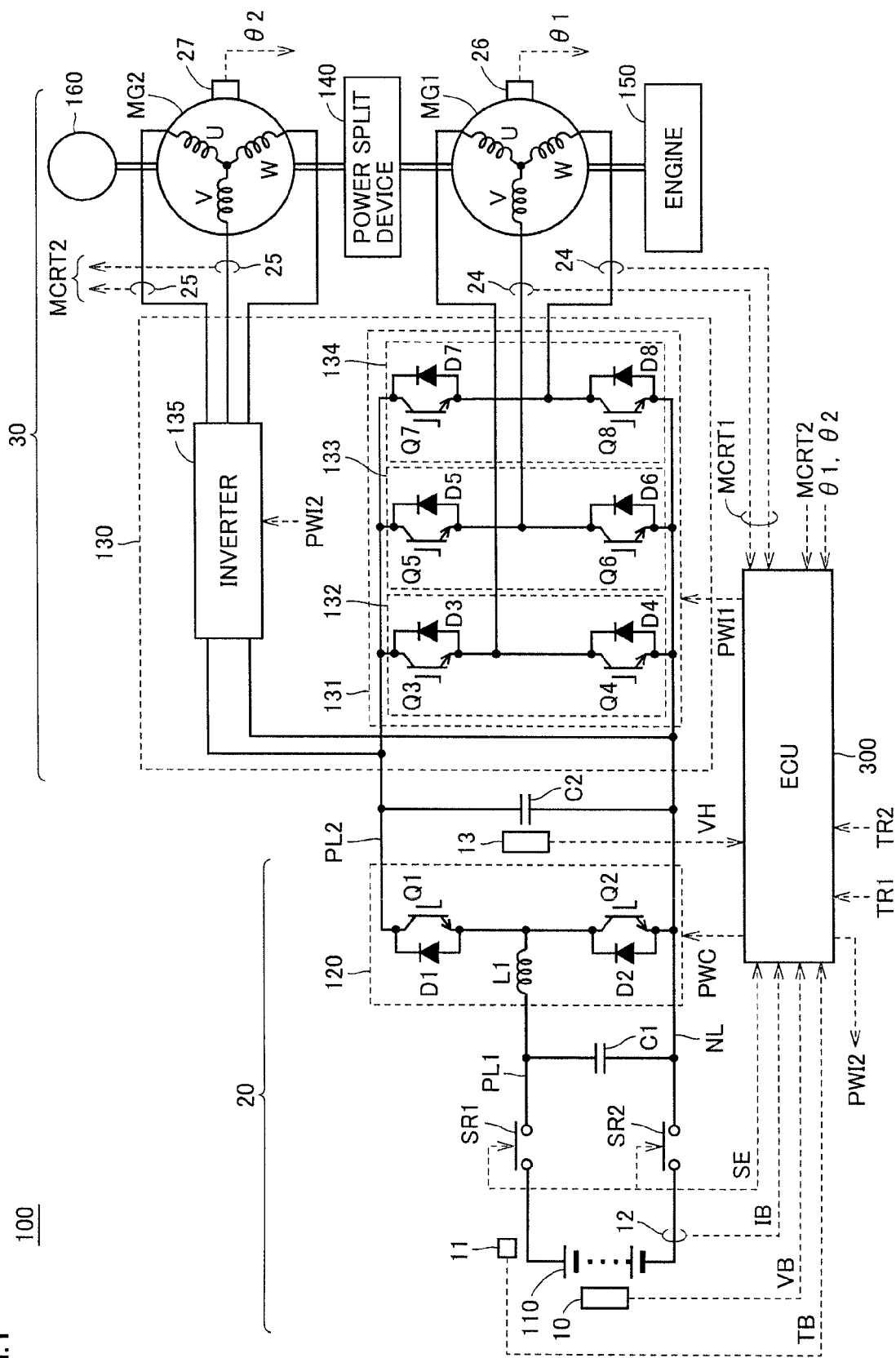
FIG. 1 is an overall configuration diagram of a vehicle on which a motor drive control system according to the present embodiment is mounted.

Embodiments of the present invention will be described hereinafter with reference to the drawings. In the following description, the same components are denoted by the same reference characters. Names and functions thereof are also the same. Therefore, detailed description on them will not be repeated.

[First Embodiment]
[Basic Configuration of Vehicle]

FIG. 1 is an overall configuration diagram of a vehicle 100 on which a motor drive control system according to the present embodiment is mounted. Although a hybrid vehicle on which an engine and a motor generator are mounted is described as an example of vehicle 100 in the present embodiment, the configuration of vehicle 100 is not limited thereto. The present invention is applicable to any vehicle that can run using electric power provided from a power storage device. In addition to the hybrid vehicle, vehicle 100 includes, for example, an electric vehicle, a fuel cell vehicle and the like.

Referring to FIG. 1, vehicle 100 includes a DC power supply unit 20, a load device 30, a capacitor C2, and a control device (hereinafter also referred to as "ECU (Electronic Control Unit)") 300.

DC power supply unit 20 includes a power storage device 110, system relays SR1 and SR2, a capacitor Cl, and a converter 120.

Power storage device 110 is typically configured to include a power storage device such as a secondary battery including a nickel-metal hydride battery, a lithium-ion battery or the like and an electric double layer capacitor. A voltage VB, a current IB and a temperature TB of power storage device 110 are detected by a voltage sensor 10, a current sensor 12 and a temperature sensor 11, respectively. Detected voltage VB, current IB and temperature TB are then outputted to ECU 300.

System relay SR1 has one end connected to a positive electrode terminal of power storage device 110, and the other end connected to a power line PL1. System relay SR2 has one end connected to a negative electrode terminal of power storage device 110, and the other end connected to a ground line NL. System relays SRI and SR2 are controlled in accordance with a signal SE provided from ECU 300, and switch between supply and interruption of electric power between power storage device 110 and converter 120.

Converter 120 includes a reactor L1, switching elements Q1 and Q2, and diodes D1 and D2. Switching elements Q1 and Q2 are serially connected between a power line PL2 and ground line NL connecting converter 120 and an inverter 130. Switching elements Q1 and Q2 are controlled in accordance with a control signal PWC provided from ECU 300.

In the present embodiment, an IGBT (Insulated Gate Bipolar Transistor), a power MOS (Metal Oxide Semiconductor) transistor, a power bipolar transistor or the like can be used as the switching element. Diodes D1 and D2 are connected in antiparallel to switching elements Q1 and Q2, respectively. Reactor L1 is connected between power line PL1 and a node connecting switching elements Q1 and Q2.

Converter 120 is basically controlled such that switching elements Q1 and Q2 are complementarily and alternately turned on and off in each switching cycle. During boost operation, converter 120 boosts voltage VB supplied from power storage device 110 to a voltage VH (this DC voltage corresponding to a voltage inputted to an inverter 131 will be also referred to as "system voltage" hereinafter). This boost operation is performed by supplying electromagnetic energy stored in reactor L1 during the ON period of switching element Q2 to power line PL2 via switching element Q1 and antiparallel diode D1.

During step-down operation, converter 120 steps down voltage VH to voltage VB. This step-down operation is performed by supplying electromagnetic energy stored in reactor L1 during the ON period of switching element Q1 to ground line NL via switching element Q2 and antiparallel diode D2.

A voltage conversion ratio (ratio between VH and VB) in these boost operation and step-down operation is controlled in accordance with a ratio (duty ratio) between the ON period of switching element Q1 and the ON period of switching element Q2 in the above-mentioned switching cycle. If switching elements Q1 and Q2 are fixed to ON and OFF, respectively, VH=VB (voltage conversion ratio=1.0) is also possible.

Capacitor C2 is connected between power line PL2 and ground line NL. Capacitor C2 smoothes a DC voltage provided from converter 120 and supplies the smoothed DC voltage to inverter 130. A voltage sensor 13 detects a voltage across capacitor C2, i.e., system voltage VH and outputs the detected value to ECU 300.

Load device 30 includes inverter 130, a power split device 140, an engine 150, a driving wheel 160, and motor generators MG1 and MG2. Inverter 130 includes inverter 131 for driving motor generator MG1, and an inverter 135 for driving motor generator MG2. Although FIG. 1 shows an example in which vehicle 100 includes two sets of inverters and motor generators, vehicle 100 may include only a set of inverter 131 and motor generator MG1 or a set of inverter 135 and motor generator MG2, for example.

Motor generators MG1 and MG2 receive AC electric power supplied from inverter 130 and generate rotational driving force for causing vehicle 100 to run. Motor generators MG1 and MG2 also receive rotational force from outside and generate AC electric power and regenerative braking force in accordance with a regenerative torque command provided from ECU 300.

Further, motor generators MG1 and MG2 are coupled to engine 150 with power split device 140 interposed therebetween. Motor generators MG1 and MG2 and engine 150 are controlled such that an optimum ratio between driving force generated by engine 150 and driving force generated by motor generators MG1 and MG2 is attained. One of motor generators MG1 and MG2 may function entirely as a motor and the other may function entirely as a generator. In the present embodiment, motor generator MG1 functions as a generator driven by engine 150, and motor generator MG2 functions as a motor for driving driving wheel 160.

Power split device 140 is configured to include, for example, a planetary gear mechanism (planetary gear) to divide motive power of engine 150 into driving wheel 160 and motor generator MG1.

Inverter 131 receives the boosted voltage from converter 120 and drives motor generator MG1 to start up engine 150, for example. Inverter 131 also converts regenerative electric power generated by motor generator MG1 using mechanical motive power transmitted from engine 150, and outputs the electric power to converter 120. At this time, converter 120 is controlled by ECU 300 to operate as a step-down circuit.

Inverter 131 is configured to include U-phase upper and lower arms 132, V-phase upper and lower arms 133 and W-phase upper and lower arms 134 provided in parallel between power line PL2 and ground line NL. The upper and lower arms of each phase are constituted by switching elements serially connected between power line PL2 and ground line NL. For example, U-phase upper and lower arms 132 are configured to include switching elements Q3 and Q4. V-phase upper and lower arms 133 are configured to include switching elements Q5 and Q6. W-phase upper and lower arms 134 are configured to include switching elements Q7 and Q8. Diodes D3 to D8 are connected in antiparallel to switching elements Q3 to Q8, respectively. Switching elements Q3 to Q8 are controlled in accordance with a control signal PWI1 provided from ECU 300.

Motor generator MG1 is typically a three-phase permanent magnet-type synchronous motor in which a rotor (not shown) is provided with a permanent magnet, and respective one ends of the U-phase, V-phase and W-phase coils provided at a stator (not shown) are commonly connected to a neutral point. Furthermore, the other end of the coil of each phase is connected to a node connecting the switching elements in each of upper and lower arms 132 to 134 of the respective phases.

Motor generator MG1 generates a rotating magnetic field using an AC drive current supplied from inverter 131 to the coils of the respective phases, and rotates the rotor using this generated rotating magnetic field.

Inverter 135 is connected to converter 120 in parallel to inverter 131. Inverter 135 converts the DC voltage outputted by converter 120 into a three-phase AC voltage and outputs the voltage to motor generator MG2 that drives driving wheel 160. Inverter 135 also outputs regenerative electric power generated by motor generator MG2 during regenerative braking to converter 120. Although the internal configuration of inverter 135 is not shown, the internal configuration is similar to that of inverter 131, and thus, detailed description will not be repeated.

Upon being supplied with the DC voltage from capacitor C2 when a torque command value of motor generator MG1 is positive (TR1>0), inverter 131 drives motor generator MG1 such that the DC voltage is converted into an AC voltage by the switching operation of switching elements Q3 to Q8 in response to control signal PWI1 provided from ECU 300 and the positive torque is outputted. When the torque command value of motor generator MG1 is zero (TR1=0), inverter 131 drives motor generator MG1 such that the output torque becomes zero by the switching operation in response to control signal PWI1. As a result, motor generator MG1 is driven to generate the zero or positive torque specified by torque command value TR1.

Furthermore, at the time of regenerative braking of vehicle 100, torque command value TR1 of motor generator MG1 is set to be negative (TR1<0). In this case, inverter 131 converts the AC voltage generated by motor generator MG1 into a DC voltage by the switching operation in response to control signal PWI1 and supplies the converted DC voltage (system voltage) to converter 120 via capacitor C2. It is to be noted that regenerative braking herein includes braking with regenerative power generation when a driver driving an electric-powered vehicle operates a foot brake, as well as deceleration (or stop of acceleration) of the vehicle while carrying out regenerative power generation, in which an accelerator pedal is not pressed during running although a foot brake is not operated.

Similarly, inverter 135 receives a control signal PWI2 corresponding to a torque command value TR2 of motor generator MG2 from ECU 300 and drives motor generator MG2 such that the DC voltage is converted into an AC voltage by the switching operation in response to control signal PWI2 and prescribed torque is attained.

Current sensors 24 and 25 detect motor currents MCRT1 and MCRT2 flowing through motor generators MG1 and MG2, respectively, and output the detected motor currents to ECU 300. It is to be noted that a sum of instantaneous values of the currents flowing through the respective U, V and W phases is zero, and thus, current sensors 24 and 25 may only be arranged to detect the motor currents of the two phases as shown in FIG. 1.

Rotation angle sensors (e.g. resolvers) 26 and 27 detect rotation angles θ1 and θ2 of motor generators MG1 and MG2, and output detected rotation angles θ1 and θ2 to ECU 300, respectively. Based on rotation angles θ1 and θ2, ECU 300 can calculate rotation speeds MRN1 and MRN2 as well as angle speeds ω1 and ω2 (rad/s) of motor generators MG1 and MG2. Rotation angle sensors 26 and 27 may be omitted if ECU 300 directly calculates rotation angles θ1 and θ2 from the motor voltage and current.

ECU 300 includes a CPU (Central Processing Unit), a storage device and an input/output buffer that are not shown, and controls the equipment in vehicle 100. This control is not limited to processing by software and can also be implemented by processing by dedicated hardware (electronic circuit).

As a typical function, ECU 300 receives torque command values TR1 and TR2 calculated at a not-shown ECU of a higher level based on an amount of operation of the accelerator pedal (not shown) by the driver, and the like. Based on these torque command values TR1 and TR2, DC voltage VB detected by voltage sensor 10, current IB detected by current sensor 12, system voltage VH detected by voltage sensor 13, motor currents MCRT1 and MCRT2 provided from current sensors 24 and 25, rotation angles θ1 and θ2 provided from rotation angle sensors 26 and 27, and the like, ECU 300 then controls operation of converter 120 and inverter 130 such that motor generators MG1 and MG2 output torque corresponding to torque command values TR1 and TR2. In other words, ECU 300 generates control signals PWC, PWI1 and PWI2 for controlling converter 120 and inverter 130 as described above, and outputs these control signals to converter 120 and inverter 130, respectively.

During the boost operation by converter 120, ECU 300 performs feedback control over system voltage VH and generates control signal PWC such that system voltage VH matches a voltage command value.

When vehicle 100 is in the regenerative braking mode, ECU 300 generates control signals PWI1 and PWI2 such that the AC voltage generated by motor generators MG1 and MG2 is converted into a DC voltage, and outputs these control signals to inverter 130. As a result, inverter 130 converts the AC voltage generated by motor generators MG1 and MG2 into the DC voltage and supplies the DC voltage to converter 120.

Furthermore, when vehicle 100 is in the regenerative braking mode, ECU 300 generates control signal PWC such that the DC voltage supplied from inverter 130 is stepped down, and outputs control signal PWC to converter 120. As a result, the AC voltage generated by motor generators MG1 and MG2 is converted into the DC voltage, and further, the DC voltage is stepped down and supplied to power storage device 110.

[Motor Control Configuration]

Figure 2:
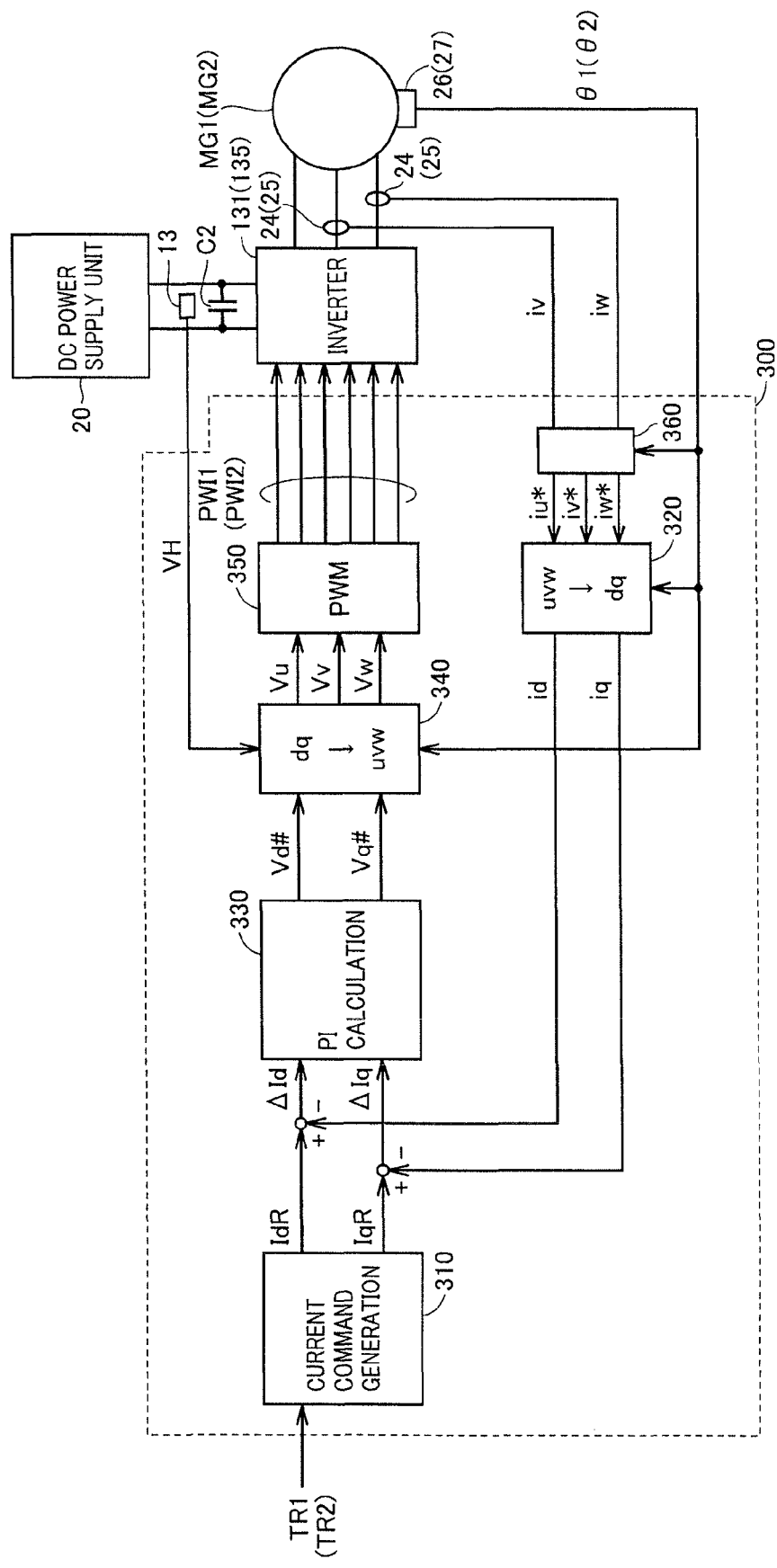
FIG. 2 is a control block diagram for describing a motor control configuration in an ECU of the vehicle shown in FIG. 1.

FIG. 2 is a control block diagram for describing a motor control configuration in ECU 300 of vehicle 100 shown in FIG. 1. Although control over motor generator MG1 is described by way of example in FIG. 2, control blocks shown in FIG. 2 are separately provided for each of motor generators MG1 and MG2 in ECU 300.

Referring to FIG. 2, ECU 300 includes a current command generation unit 310, coordinate conversion units 320 and 340, a PI calculation unit 330, a PWM signal generation unit 350, and a correction unit 360.

Based on a table and the like prepared in advance, current command generation unit 310 generates current command values IdR and IqR in accordance with torque command value TR1 of motor generator MG1.

Correction unit 360 receives motor current MCRT1 (iv, iw, iu=−(iv+iw)) detected by current sensor 24 and rotation angle θ1 of motor generator MG1 detected by rotation angle sensor 26. Correction unit 360 corrects motor current MCRT1 based on these information, and outputs corrected motor currents iu*, iv* and iw* to coordinate conversion unit 320. A specific method for correcting motor current MCRT1 by correction unit 360 will be described below.

By coordinate conversion (three-phase two-phase) using rotation angle θ1 of motor generator MG1, coordinate conversion unit 320 calculates a d axis current id and a q axis current iq based on motor currents iu*, iv* and iw* provided from correction unit 360.

A deviation ΔId (ΔId=IdR−id) from a command value of the d axis current and a deviation ΔIq (ΔIq=IqR−iq) from a command value of the q axis current are inputted to PI calculation unit 330. PI calculation unit 330 performs PI calculation for d axis current deviation ΔId and q axis current deviation ΔIq using a prescribed gain to obtain a control deviation, and generates a d axis voltage command value Vd# and a q axis voltage command value Vq# corresponding to this control deviation.

Coordinate conversion unit 340 receives rotation angle θ1 of motor generator MG1 provided from rotation angle sensor 26, d axis and q axis voltage command values Vd# and Vq# provided from PI calculation unit 330, and voltage value VH detected by voltage sensor 13. Coordinate conversion unit 340 performs coordinate conversion (two-phase→three-phase) based on these information, and converts d axis voltage command value Vd# and q axis voltage command value Vq# into voltage command values Vu, Vv and Vw of the respective U, V and W phases.

PWM signal generation unit 350 generates switching control signal PWI1 (PWI2) of inverter 131 (135) shown in FIG. 1 based on comparison between voltage command values Vu, Vv and Vw of the respective phases and a prescribed carrier wave.

Inverter 131 (135) is subjected to switching control in accordance with switching control signal PWI1 (PWI2) generated by ECU 300. As a result, the AC voltage for outputting torque corresponding to torque command value TR1 (TR2) is applied to motor generator MG1 (MG2).

[Description of Current Correction Control]

In the above-mentioned motor generator having the rotor provided with the permanent magnet, it is known that when the rotor rotates, the counter-electromotive voltage proportional to the rotation speed of the rotor is generated. In addition, the permanent magnet generally has a property that magnetic force thereof becomes smaller as the temperature becomes higher and becomes greater as the temperature becomes lower. Therefore, when the motor generator is driven in a state in which the temperature of the permanent magnet is low such as at extremely low temperature, the counter-electromotive voltage generated at the same rotation speed is larger than that when the temperature of the permanent magnet is higher.

Figure 3:
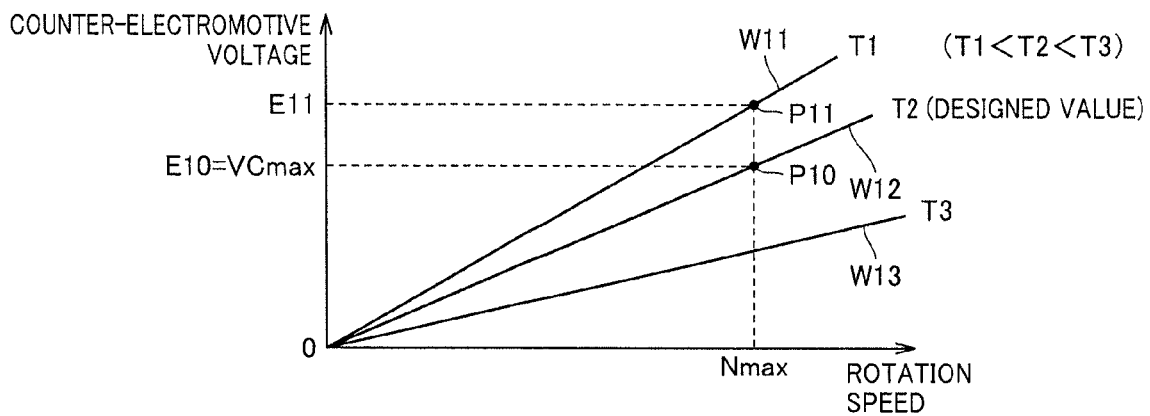
FIG. 3 shows one example of a relationship between a rotation speed and a counter-electromotive voltage in a motor generator having a rotor provided with a permanent magnet.

FIG. 3 shows one example of a relationship between the rotation speed and the counter-electromotive voltage in the motor generator having the rotor provided with the permanent magnet. As described above, the generated counter-electromotive voltage increases in proportion to the rotation speed, and the counter-electromotive voltage decreases as the magnet temperature becomes higher.

The motor drive control system mounted on vehicle 100 as shown in FIG. 1 is designed with a temperature T2 (e.g., 75° C.) shown in FIG. 3 as a basis, for example. The withstand voltage of the equipment such as the capacitor is basically set such that the equipment can endure a counter-electromotive voltage El0 generated at a maximum rotation speed Nmax of the motor generator at this reference temperature.

However, as shown by a line W11 in FIG. 3, the counter-electromotive voltage generated when the temperature of the motor generator is a temperature T1 lower than reference temperature T2 is larger at the same rotation speed than the counter-electromotive voltage generated when the temperature of the motor generator is reference temperature T2 (a line W12 in FIG. 3). In this case, the counter-electromotive voltage at maximum rotation speed Nmax is E11 (>E10).

Therefore, in order to cover the conditions in the low-temperature state as described above, the withstand voltage when the temperature of the motor generator is reference temperature T2 must be increased, which may lead to occurrence of problems such as an increase in cost and an increase in size of the equipment caused by an increase in size of the elements. In addition, if these conditions are not taken into consideration, breakage and degradation of the equipment may occur. Alternatively, if the rotation speed is restricted such that the withstand voltage of the equipment is not exceeded, the driving performance may become deteriorated.

Thus, in the present embodiment, current correction control by which an offset current is superimposed on at least one phase of the three-phase coils of the stator of the motor generator is performed. As a result, it can be expected that the temperature of the rotor rotating in the magnetic field generated due to the offset current is raised and the generated counter-electromotive voltage is reduced.

Figure 4:
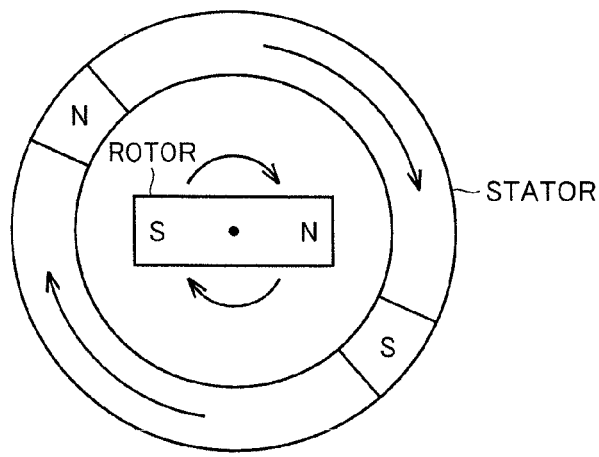
FIG. 4 is a schematic diagram of a cross section of the motor generator perpendicular to a rotation axis thereof.
Figure 5:
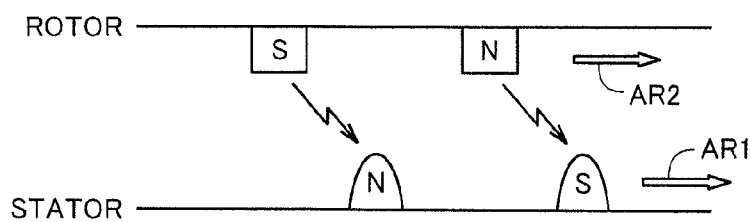
FIG. 5 shows a relationship between a rotor and a stator in FIG. 4 in a planar view.

FIG. 4 is a schematic diagram of a cross section of the motor generator perpendicular to a rotation axis thereof As described above, when an AC current is supplied to the coil wound around the stator, the rotating magnetic field is generated. Then, the rotor provided with the permanent magnet is attracted to the rotating magnetic field generated at the stator, and thereby the rotor rotates. FIG. 5 shows a relationship between the rotor and the stator in FIG. 4 in a planar view. The rotating magnetic field at the stator moves in the direction shown by an arrow AR1 that is the rotation direction, thereby moving the magnetic poles of the permanent magnet of the rotor in the direction shown by an arrow AR2.

Figure 6:
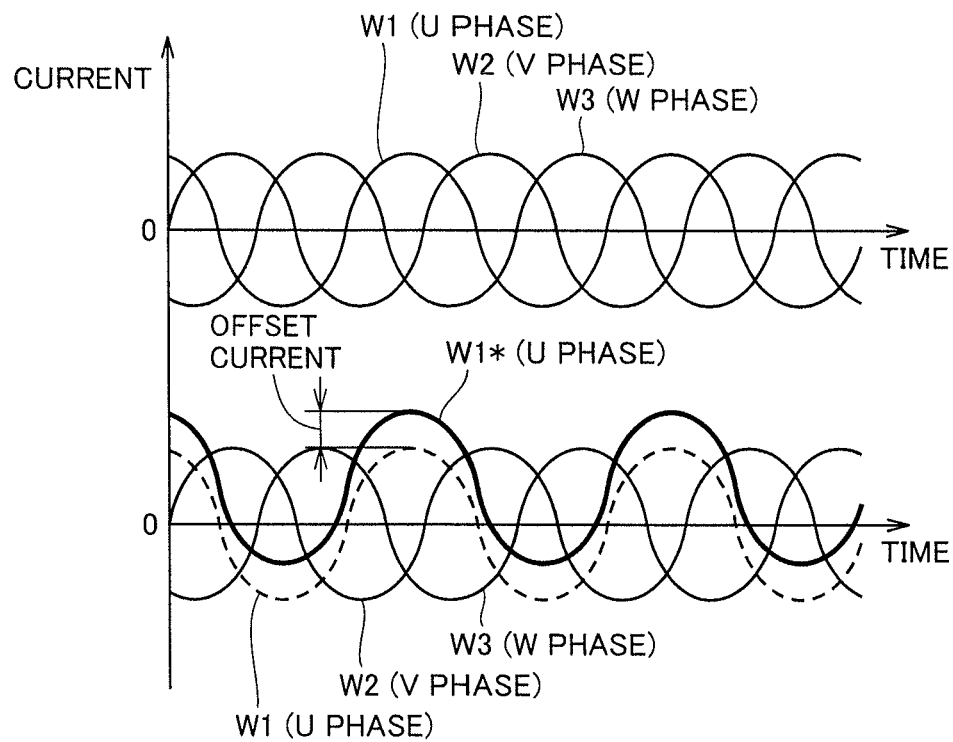
FIG. 6 is a diagram for describing an example of current waveforms of respective phases of the motor generator in the present embodiment.
Figure 7:
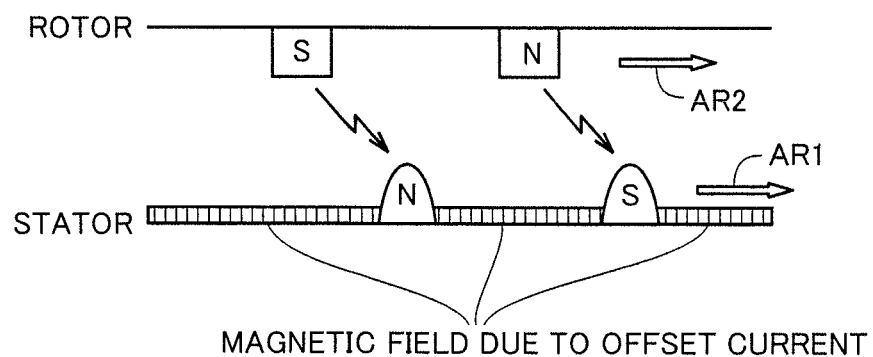
FIG. 7 shows a relationship between the rotor and the stator in a planar view when current correction control in the present embodiment is applied.

FIG. 6 shows an example of current waveforms of the respective phases of the motor generator in the present embodiment.

The upper waveforms in FIG. 6 show current waveforms in a comparative example in which the current correction control according to the present embodiment is not applied. Current waveforms W1, W2 and W3 of the respective U, V and W phases are sinusoidal waves having a phase difference of 120° with respect to one another.

The lower waveforms in FIG. 6 show one example of current waveforms when the current correction control according to the present embodiment is applied. FIG. 6 shows the case where the positive offset current is superimposed on the U-phase current (a line W1* in FIG. 6). When such offset current is superimposed, a certain magnetic field is generated at the stator due to the offset current, in addition to the rotating magnetic field. When the permanent magnet of the rotor moves through this certain magnetic field, an eddy current is generated on the permanent magnet by electromagnetic induction. This eddy current is consumed by an electrical resistance of the permanent magnet, thereby raising the temperature of the permanent magnet. It is to be noted that the offset current may be superimposed on any one of the U-, V- and W-phase coils. Alternatively, as long as the certain magnetic field is generated, the offset current may be superimposed on coils of a plurality of phases, not a coil of one phase.

On the other hand, superimposition of the offset current as described above may lead to deterioration of the accuracy of the torque finally outputted from the motor generator and occurrence of torque variation. As a result, particularly when the rotation speed of the motor generator is low, vibration caused by this torque variation is easily felt by a vehicle's occupant and brings a sense of discomfort to the vehicle's occupant. Therefore, in the present embodiment, when the rotation speed of the motor generator is low, the above-mentioned offset current is not superimposed to suppress the vibration caused by the torque variation and reduce the sense of discomfort to the vehicle's occupant.

The magnitude of the superimposed offset current can be set to a certain value regardless of the rotation speed of the motor generator. As described above, however, the counter-electromotive voltage generated at the motor generator increases as the rotation speed becomes higher, and thus, it is preferable, from the viewpoint of protection of the equipment, to raise the temperature of the permanent magnet in a shorter time when the rotation speed is high. Therefore, in the present embodiment, the magnitude of the superimposed offset current is increased in accordance with an increase in the rotation speed. As a result, the intensity of the certain magnetic field generated due to the offset current increases as the rotation speed becomes higher, and thus, the eddy current generated at the permanent magnet increases as well and an amount of temperature rise of the permanent magnet increases.

Although the torque variation increases as the magnitude of the offset current increases, the inertia of the rotor and the vehicle also increases as the rotation speed becomes higher, and thus, an influence by the torque variation does not easily manifest itself Furthermore, since the period of the torque variation also becomes shorter, there is a tendency that the vehicle's occupant does not easily feel the vibration caused by the torque variation.

Figure 8:
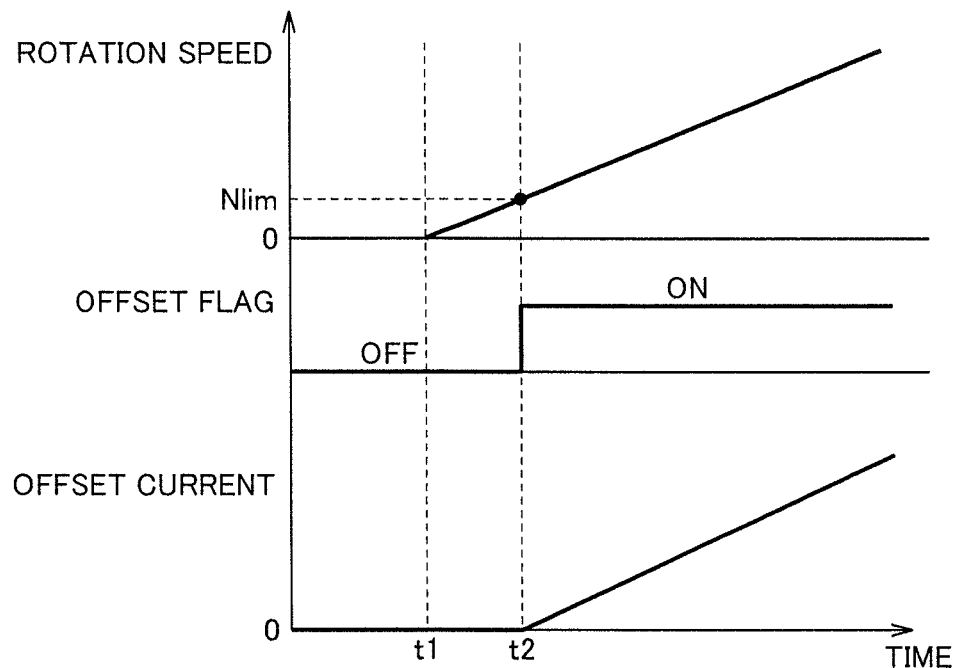
FIG. 8 shows a first example of a method for setting an offset current corresponding to the rotation speed of the motor generator.

FIG. 8 shows one example of a method for setting the offset current corresponding to the rotation speed of the motor generator. In FIG. 8, the horizontal axis indicates time and the vertical axis indicates the rotation speed of the motor generator, an offset flag indicating whether or not to perform the current correction control, and the magnitude of the superimposed offset current.

Referring to FIG. 8, at time t1, the vehicle starts to run and the rotation speed of the motor generator increases with time. At this time, until time t2 when the rotation speed reaches a reference rotation speed Nlim, the offset flag is set OFF in order to suppress the vibration caused by the torque variation, and the offset current is set to zero.

After time t2 when the rotation speed of the motor generator is larger than reference rotation speed Nlim, the offset flag is set ON and the offset current is set to linearly increase substantially in proportion to the increase in the rotation speed.

Figure 9:
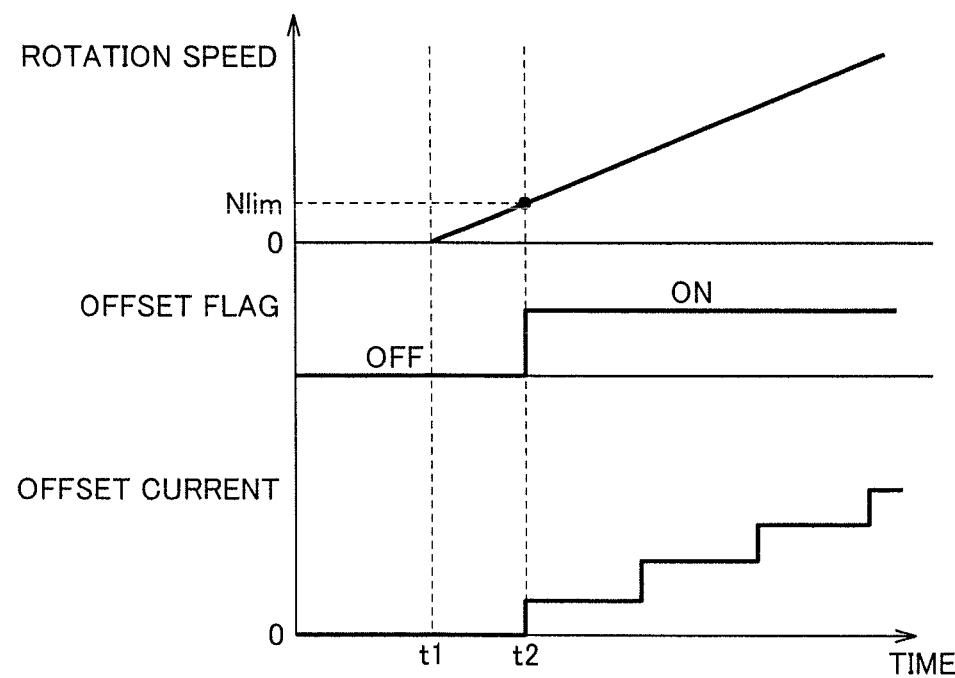
FIG. 9 shows a second example of the method for setting the offset current corresponding to the rotation speed of the motor generator.
Figure 10:
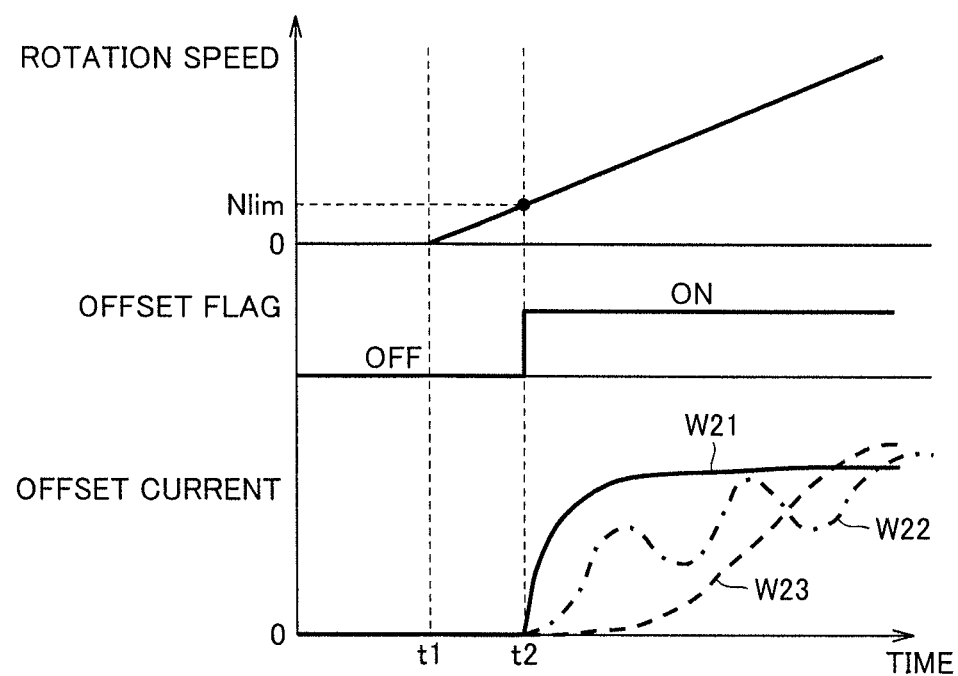
FIG. 10 shows a third example of the method for setting the offset current corresponding to the rotation speed of the motor generator.

It is to be noted that a method other than the method for linearly changing the offset current with respect to the rotation speed as shown in FIG. 8 can also be used as a method for increasing the offset current. For example, as shown in FIG. 9, the offset current may be set to increase in a stepwise manner with an increase in the rotation speed of the motor generator. Alternatively, as shown in FIG. 10, the offset current may be set using a preset map. In this map, using other parameters such as an air temperature and a rate of increase in the rotation speed, for example, there may be employed a pattern where the offset current is rapidly increased and the temperature is rapidly raised as shown by a line W21 or a pattern where the offset current is gradually increased as shown by a line W23. Furthermore, there may be employed a pattern where the magnitude of the offset current is temporarily decreased in a particular rotation speed region in consideration of the resonance frequency band of the drive system, for example (a line W22).

Then, in correction unit 360 in FIG. 2, the offset current set as described above is subtracted from a current value of a prescribed phase of the U, V and W phases detected by current sensor 24, thereby setting motor currents iu*, iv* and iw*. Since the offset current is subtracted from the feedback value of the motor current as described above, feedback control is performed in PI calculation unit 330 such that the subtracted current is compensated. As a result, voltage command values Vu, Vv and Vw are outputted from coordinate conversion unit 340 such that the offset current is superimposed on the current of the prescribed phase.

Figure 11:
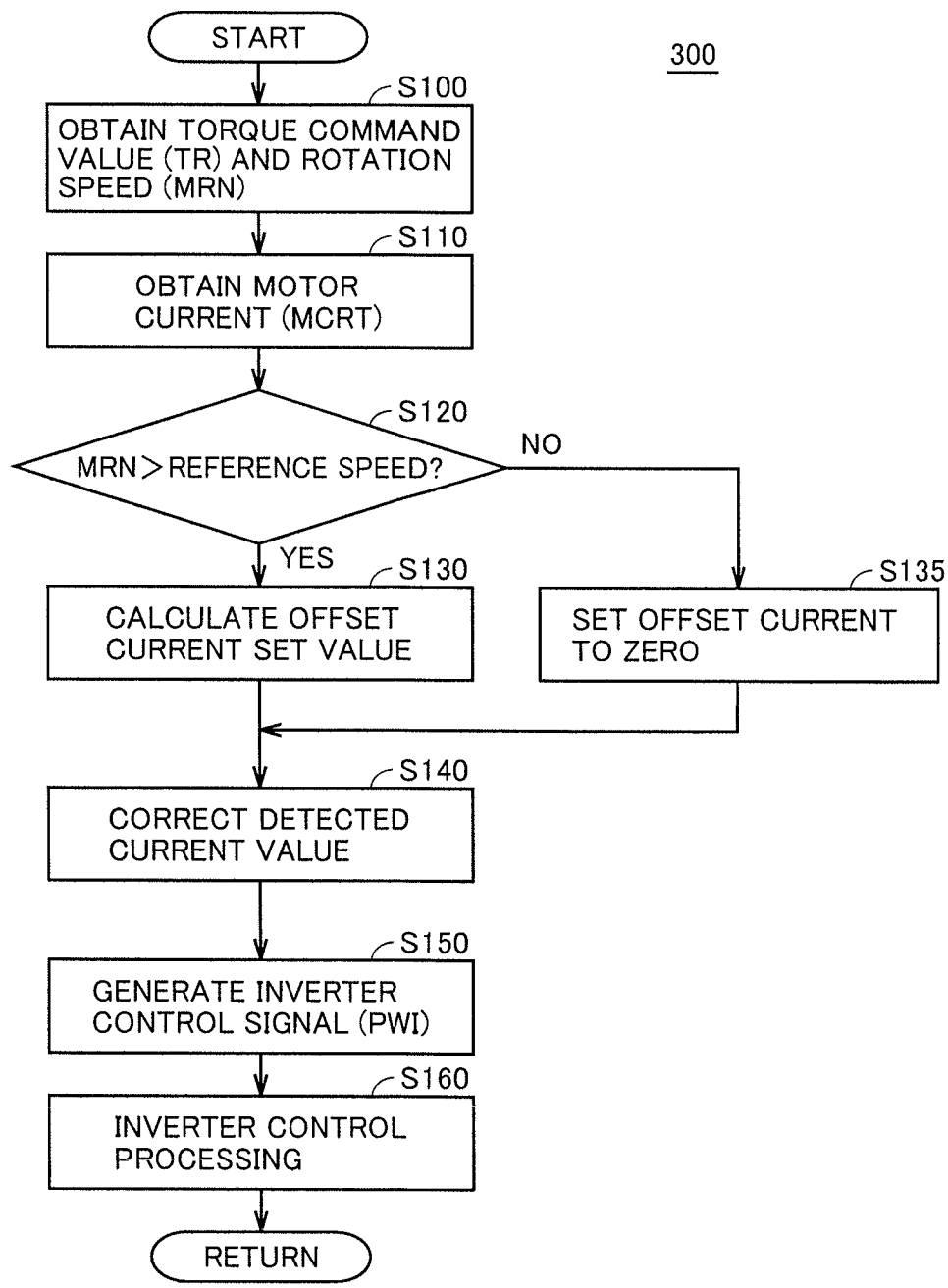
FIG. 11 is a flowchart for describing details of a current correction control process executed by the ECU in the present embodiment.

FIG. 11 is a flowchart for describing details of a current correction control process executed by ECU 300 in the embodiment. Each step in the flowcharts shown in FIG. 11 and FIGS. 13, 16 and 20 described below is implemented by calling a program prestored in ECU 300 from a main routine and executing the program at a prescribed cycle. Alternatively, a part of the steps can also be implemented by dedicated hardware (electronic circuit). It is to be noted that the flowchart is separately provided and executed for each of motor generators MG1 and MG2.

The current correction control is basically performed in the case where the vehicle starts up when the temperature of the permanent magnet of motor generators MG1 and MG2 is low. It is relatively difficult to directly measure the temperature of the permanent magnet. With regard to the temperature related to the temperature of the permanent magnet, the temperature of the stator or a casing of motor generators MG1 and MG2, temperature TB of power storage device 110, the temperature of cooling water in engine 150 and inverters 131 and 135, or the like, for example, can be used as a parameter, and when it is lower than a prescribed reference temperature, it may be determined that the temperature of the permanent magnet is low. Alternatively, the temperature of the permanent magnet may be determined using other parameters such as external temperature.

Referring to FIGS. 1 and 11, when vehicle 100 starts up in the low-temperature environment, ECU 300 obtains torque command values TR1 and TR2 provided from the ECU of a higher level as well as rotation speeds MRN1 and MRN2 of motor generators MG1 and MG2 defined based on rotation angles θ1 and θ2 provided from rotation angle sensors 26 and 27 in step (hereinafter the step will be abbreviated as "S") 100.

Next, in S110, ECU 300 obtains motor currents MCRT1 and MCRT2 provided from current sensors 24 and 25.

In S120, ECU 300 determines whether or not each of rotation speeds MRN1 and MRN2 is higher than a predetermined reference speed. This reference speed may be set to a value common to motor generators MG1 and MG2, or to values different between motor generators MG1 and MG2.

If the rotation speed is higher than the reference speed (YES in S120), the process proceeds to S130 and ECU 300 calculates a set value of the superimposed offset current using any one of the methods shown in FIGS. 8 to 10.

Then, in S140, ECU 300 corrects detected motor currents MCRT1 and MCRT2 such that the offset current calculated in 5130 is subtracted from a current value of a prescribed phase in correction unit 360 in FIG. 2, and calculates motor currents iu*, iv* and iw*.

Thereafter, the process proceeds to 5150 and ECU 300 performs feedback control using corrected motor currents iu*, iv* and iw*, thereby generating control signals PWI1 and PWI2 of inverters 131 and 135. Then, in S160, ECU 300 outputs generated control signals PWI1 and PWI2 to motor generators MG1 and MG2, and controls inverters 131 and 135, respectively.

On the other hand, if the rotation speed is equal to or lower than the reference speed (NO in S120), the process proceeds to S135 and ECU 300 sets the offset current to zero. Then, the process proceeds to S140 and motor currents MCRT1 and MCRT2 are corrected by the offset current set value. In this case, the offset current is set to zero, and thus, ECU 300 performs feedback control over values of motor currents MCRT1 and MCRT2 detected by current sensors 24 and 25, and controls inverters 131 and 135 (S150, S160).

With execution of the process in accordance with the above-mentioned control, the offset current can be superimposed on the coil of at least one phase of the motor generator, and the temperature of the permanent magnet provided at the rotor can be raised. As a result, an increase in cost caused by preventing an increase in the withstand voltage of the equipment due to an increase in the counter-electromotive voltage at the time of low temperature can be suppressed, and degradation and breakage of the equipment can be prevented. Furthermore, restricting the rotation speed is not necessary, and thus, deterioration of the driving performance can also be suppressed.

[Modification of First Embodiment]

In the above-mentioned first embodiment, description has been given to the configuration in which the offset current is superimposed by the feedback control using motor currents iu*, iv* and iw* obtained by subtracting the offset current from the detected value of the motor current. The offset current may, however, be added directly to current command values IdR and IqR generated by current command generation unit 310 in FIG. 2.

Figure 12:
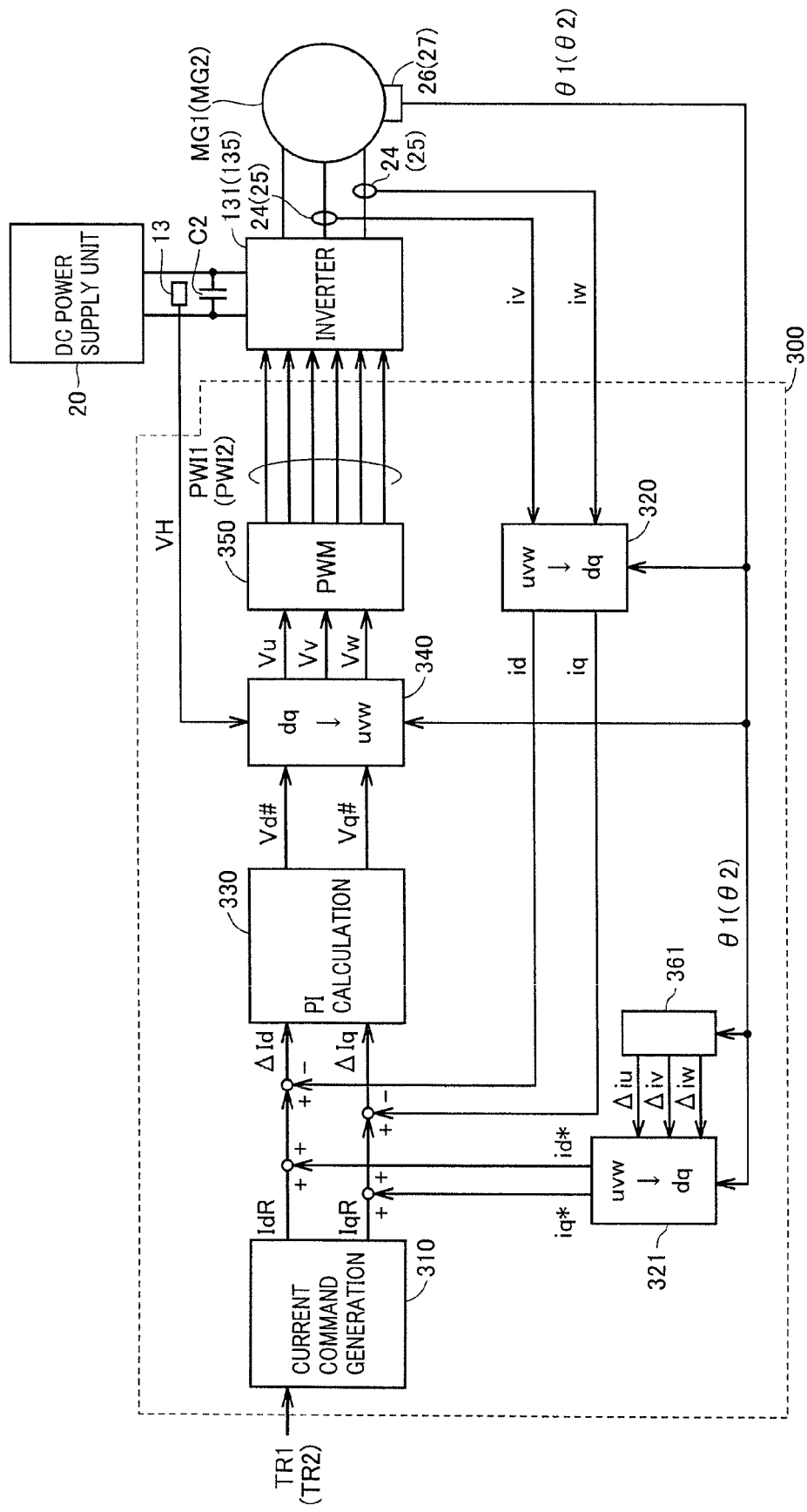
FIG. 12 is a control block diagram for describing a motor control configuration in the ECU in a modification.

FIG. 12 is a control block diagram for describing a motor control configuration in ECU 300 in a modification. The control block diagram in FIG. 12 is different from the control block diagram in the first embodiment shown in FIG. 2 in that correction unit 360 is deleted, and instead of correction unit 360, a correction unit 361 and a coordinate conversion unit 321 are added. Description of elements overlapping with the elements in FIG. 2 will not be repeated in FIG. 12.

Referring to FIG. 12, coordinate conversion unit 320 receives motor current MCRT1 (iv, iw, iu=−(iv+iw)) detected by current sensor 24 and rotation angle θ1 of motor generator MG1 detected by rotation angle sensor 26. Then, by coordinate conversion (three-phase→two-phase) using rotation angle θ1 of motor generator MG1, coordinate conversion unit 320 calculates d axis current id and q axis current iq based on motor currents iv, iw and iu.

Correction unit 361 receives rotation angle θ1 of motor generator MG1 detected by rotation angle sensor 26. Then, correction unit 361 sets superimposed offset currents Δiu, Δiv and Δiw using any one of the methods shown in FIGS. 8 to 10, based on rotation speed MRN1 of motor generator MG1 defined from rotation angle θ1, and outputs these offset currents to coordinate conversion unit 321.

By coordinate conversion (three-phase→two-phase) using rotation angle θ1 of motor generator MG1, coordinate conversion unit 321 calculates corrected values id* and iq* based on offset currents Δiu, Δiv and Δiw, and adds these corrected values to current command values IdR and IqR generated by current command generation unit 310, thereby correcting the current command values.

As a result, current deviations ΔId and ΔIq inputted to PI calculation unit 330 are set as follows:

$$\Delta Id = IdR + id^* - id \quad (1)$$

$$\Delta Iq = IdQ + iq^* - iq \quad (2)$$

Using these current deviations ΔId and ΔIq, PI calculation unit 330 generates d axis voltage command value Vd# and q axis voltage command value Vq#.

Figure 13:
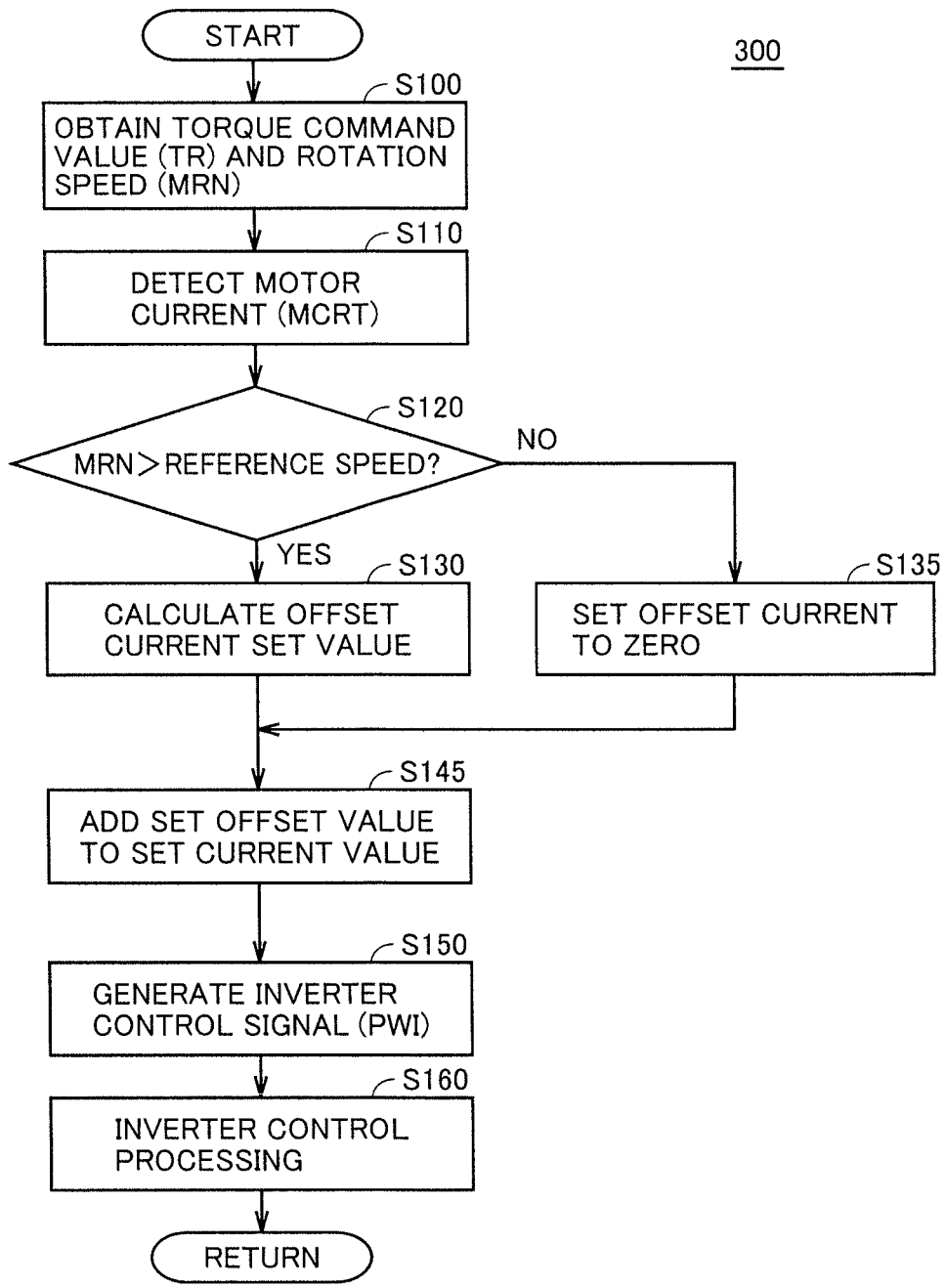
FIG. 13 is a flowchart for describing details of a current correction control process executed by the ECU in the modification.

FIG. 13 is a flowchart for describing details of a current correction control process executed by ECU 300 in the modification. The flowchart in FIG. 13 is different from the flowchart in the first embodiment shown in FIG. 11 in that step S140 is replaced with S145. Description of steps overlapping with the steps in FIG. 11 will not be repeated in FIG. 13.

If rotation speeds MRN1 and MRN2 of motor generators MG1 and MG2 are higher than the reference speed (YES in S120), a set value of the offset current is calculated in S130. If rotation speeds MRN1 and MRN2 of motor generators MG1 and MG2 are equal to or lower than the reference speed (NO in S120), a set value of the offset current is set to zero in S135.

Thereafter, the process proceeds to S145 and ECU 300 adds offset current values id* and iq* to current command values IdR and IqR generated by current command generation unit 310 in FIG. 12.

Then, in S150, using current command values IdR and IqR to which offset current values id* and iq* are added as well as motor currents id and iq subjected to coordinate conversion by coordinate conversion unit 320, ECU 300 generates control signals PWI1 and PWI2 (S150) and controls inverters 131 and 135 (S160).

As described above, also in the configuration in which the offset current is added to the current command value, the offset current can be superimposed on the coil of at least one phase of the motor generator similarly to the first embodiment.

[Second Embodiment]

Figure 14:
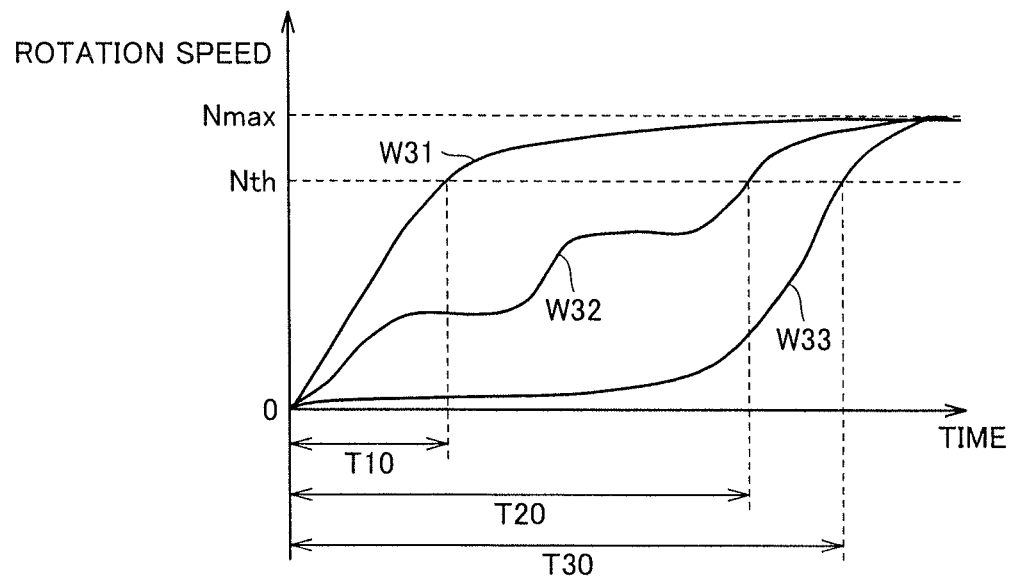
FIG. 14 shows an example of change in the rotation speed of the motor generator.

There are various paths of the speed from when running of the vehicle starts to when the rotation speed of the motor generator reaches the maximum rotation speed. FIG. 14 shows an example of the rotation speed of the motor generator changing with time. The paths include, for example, the case where the rotation speed reaches a high rotation speed in a relatively short time after running starts as shown by a line W31, the case where a low rotation speed continues for a while, and then, the speed increases sharply as shown by a line W33, the case where the rotation speed increases gradually in stages as shown by a line W32, or the like.

In order to handle these various paths, the temperature of the permanent magnet of the motor generator must be raised to a desired temperature by the time the rotation speed reaches a prescribed reference rotation speed Nth before reaching maximum rotation speed Nmax. In the current correction control described in the first embodiment, using a time change rate of the rotation speed and the like as a parameter, the magnitude of the offset current is basically adjusted such that the temperature of the permanent magnet reaches the desired temperature when the rotation speed reaches prescribed reference rotation speed Nth.

On the other hand, superimposition of the offset current as described above results in occurrence of the vibration caused by occurrence of the torque variation, and supply of the offset current results in a reduction in efficiency. Therefore, it is desirable to immediately stop the current correction control when the temperature of the permanent magnet rises to the desired temperature.

In this case, providing a temperature sensor to detect the actual temperature of the motor generator is also possible. However, this may possibly lead to an increase in cost due to addition of the equipment or the impossibility of appropriately stopping the control when a failure occurs in the sensor.

Figure 15:
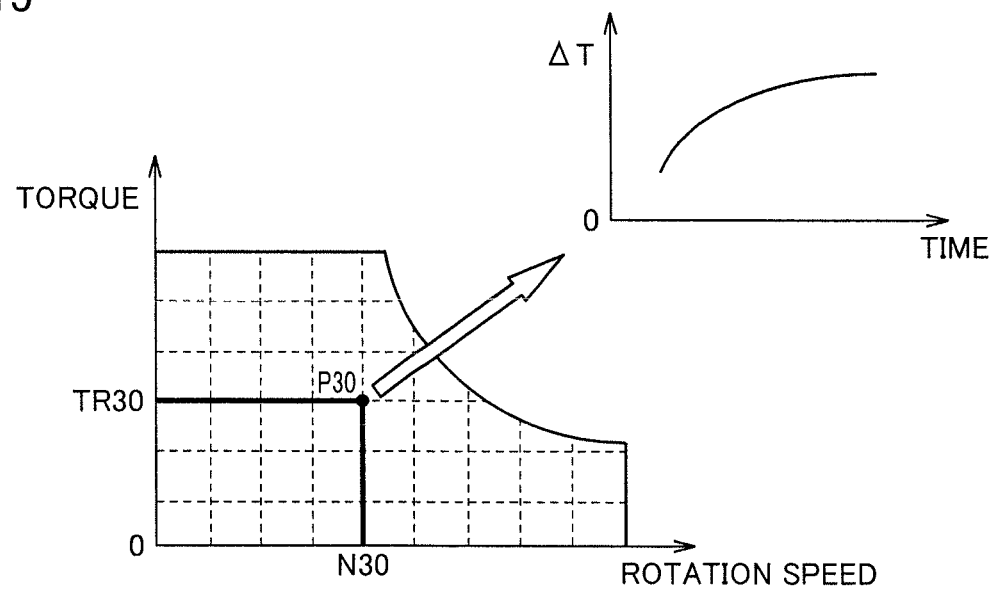
FIG. 15 shows one example of a map of an amount of temperature rise at each operating point defined based on a torque command value and a rotation speed in a second embodiment.

Therefore, in the second embodiment, as shown in FIG. 15, an amount of temperature rise of the permanent magnet at each operating point defined based on the torque command value and the rotation speed is calculated using a map measured in advance by experiments and the like, and this amount of temperature rise ΔT is summed in the time axis direction, thereby estimating the temperature of the permanent magnet of the motor generator. Based on the fact that the estimated temperature of the permanent magnet reaches the desired temperature, superimposition of the offset current is stopped, thereby preventing the temperature of the permanent magnet from rising to a temperature higher than necessary.

Figure 16:
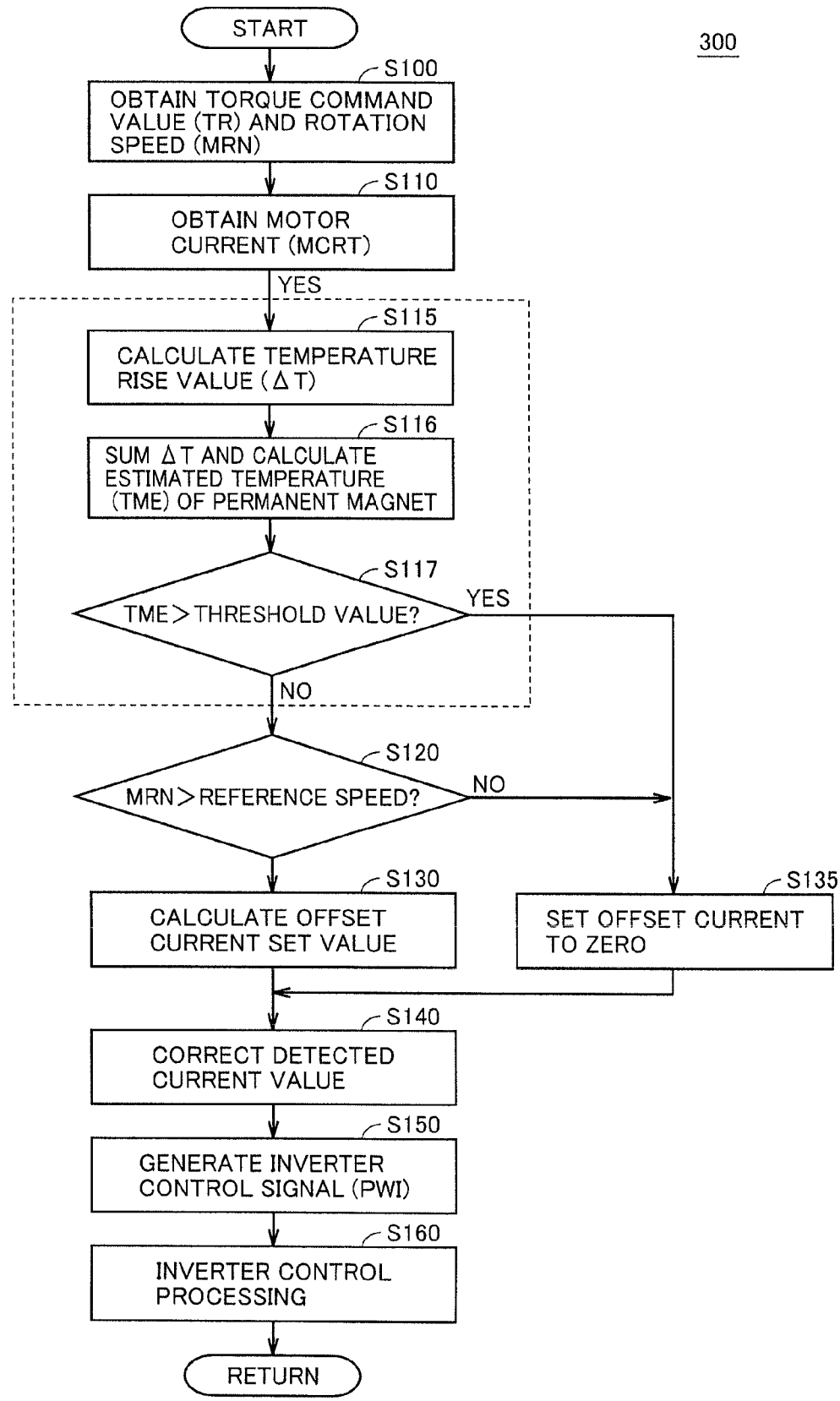
FIG. 16 is a flowchart for describing details of a current correction control process executed by the ECU in the second embodiment.

FIG. 16 is a flowchart for describing details of a current correction control process executed by ECU 300 in the second embodiment. The flowchart in FIG. 16 is different from the flowchart in the first embodiment shown in FIG. 11 in that steps S115 to S117 are added. Description of steps overlapping with the steps in FIG. 11 will not be repeated in FIG. 16.

Referring to FIG. 16, in S110, ECU 300 obtains the motor current. Next, in S115, ECU 300 calculates value of temperature rise ΔT of the permanent magnet using the map shown in FIG. 15, for example, based on the present torque command value and rotation speed. At this time, maps of different values of temperature rise ΔT are suitably used when the offset current is superimposed and when the offset current is not superimposed.

Then, in S116, ECU 300 adds value of temperature rise ΔT obtained in S115 to the present temperature of the permanent magnet, and calculates an estimated temperature value TME of the permanent magnet. With regard to the present temperature of the permanent magnet, the external temperature may be used as an initial value when the operation of the vehicle starts, for example. After the operation of the vehicle starts, value of temperature rise ΔT may be added to the present temperature of the permanent magnet, using the estimated temperature value calculated in the previous control cycle as the present temperature of the permanent magnet.

Next, in S117, ECU 300 determines whether or not estimated temperature value TME of the permanent magnet calculated in S116 is larger than a threshold value of the desired temperature.

If estimated temperature value TME of the permanent magnet is equal to or smaller than the threshold value (NO in S117), ECU 300 determines that raising the temperature of the permanent magnet is necessary, and executes the process in S120 and the subsequent steps to raise the temperature of the permanent magnet similarly to the first embodiment.

On the other hand, if estimated temperature value TME of the permanent magnet is larger than the threshold value (YES in S117), ECU 300 determines that the temperature of the permanent magnet has been sufficiently raised. Then, the process proceeds to S135 and ECU 300 sets the offset current to zero.

With the control in accordance with the above-mentioned process, it can be determined that the temperature of the permanent magnet reaches the desired temperature without separately placing a detection device for measuring the temperature of the permanent magnet. Furthermore, based on the fact that the temperature of the permanent magnet reaches the desired temperature, superimposition of the offset current can be stopped. As a result, the temperature of the permanent magnet can be prevented from rising to a temperature higher than necessary, and occurrence of the vibration and reduction in efficiency can be suppressed.

[Third Embodiment]

In the first embodiment, description has been given to the configuration in which the offset current is superimposed on the coil of at least one phase of the motor generator, thereby raising the temperature of the permanent magnet. However, if an excessive offset current is superimposed at the time of extremely lower temperature or when it is desired to complete raising the temperature of the motor generator in a shorter time, the torque variation increases. As a result, the vibration received by the vehicle's occupant may increase or appropriate driving of the motor generator may become impossible.

Thus, in a third embodiment, when further raising the temperature is necessary as described above, a carrier frequency of a carrier wave in generating the PWM signal is reduced, in addition to superimposition of the offset current on the motor generator. This reduction in the carrier frequency results in an increase in a ripple current, which is a harmonic component of the current supplied to the motor generator. Therefore, it can be expected that the temperature of the motor generator is raised due to a loss caused by the ripple current.

Figure 17:
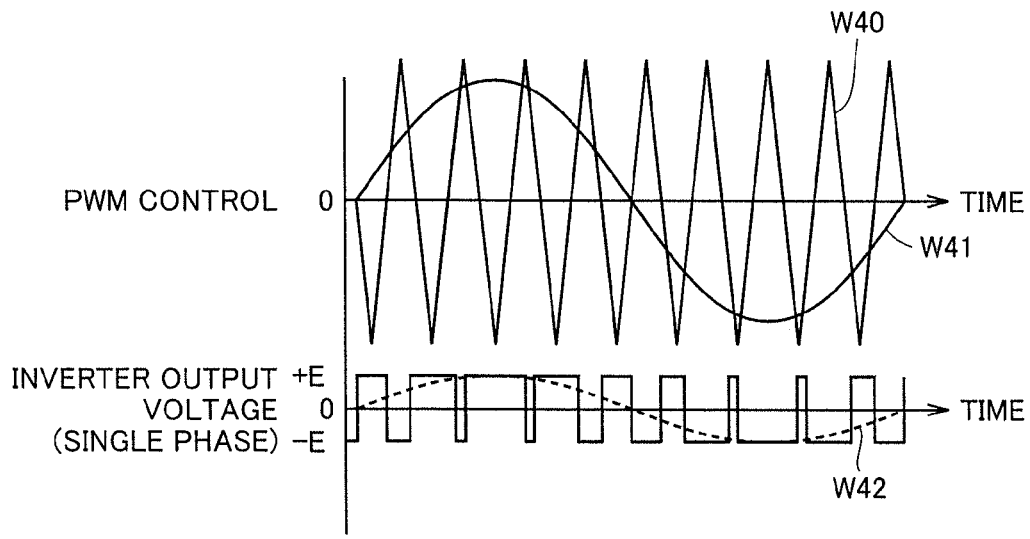
FIG. 17 shows one example of a waveform diagram describing pulse width modulation (PWM) control in a PWM signal generation unit.

FIG. 17 shows a waveform diagram describing pulse width modulation (PWM) control in PWM signal generation unit 350 in FIG. 2.

The PWM control refers to a control scheme in which an output voltage average value in every cycle is changed by changing a pulse width of a square-wave output voltage at every fixed cycle. Generally, the above-mentioned pulse width modulation control is performed by dividing the fixed cycle into a plurality of switching cycles corresponding to the cycle of the carrier wave and controlling ON and OFF of switching elements at every switching cycle.

Referring to FIG. 17, in PWM signal generation unit 350, a signal wave W41 corresponding to voltage command values Vu, Vv and Vw of the respective phases provided from coordinate conversion unit 340 is compared with a carrier wave W40 having a prescribed frequency. Then, between a section in which the carrier wave voltage is higher than the signal wave voltage and a section in which the signal wave voltage is higher than the carrier wave voltage, the switching element in the arm of each phase of inverter 131 (135) is switched between ON and OFF, and thereby the AC voltage, which is a collection of square-wave voltages, can be supplied to motor generator MG1 (MG2) as an inverter output voltage of each phase. The fundamental wave component of this AC voltage is shown by a dotted line W42 in FIG. 17. In other words, the frequency (carrier frequency) of carrier wave W40 corresponds to the switching frequency of each switching element constituting inverter 131 (135).

It is to be noted that as shown in FIGS. 2 and 17, motor generators MG1 and MG2 are basically controlled by the PWM control. In application of the present invention, however, constantly controlling motor generators MG1 and MG2 by the pulse width modulation control is not always necessary. The PWM control and other control such as rectangular-wave voltage control may be selectively applied depending on the state of the motor.

Figure 18:
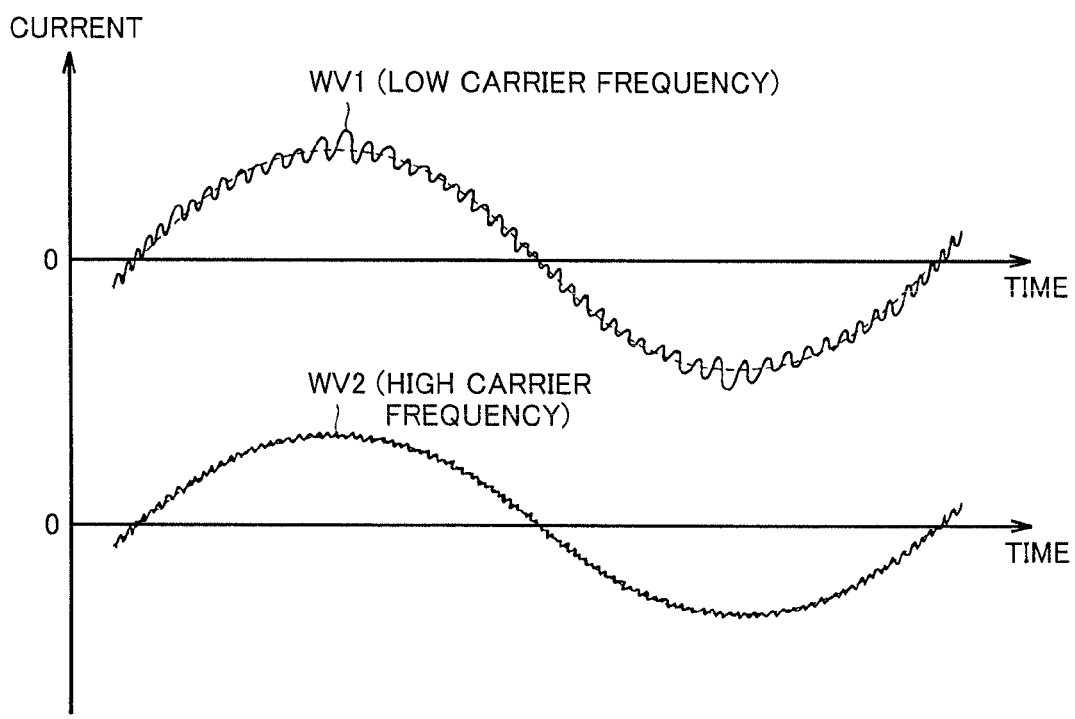
FIG. 18 shows a relationship between a carrier frequency and an inverter output current (motor current) in the PWM control.

FIG. 18 shows a relationship between the carrier frequency and the inverter output current (motor current) in the PWM control. Although FIG. 18 shows an output current of the U phase of the inverter by way of example, output currents of the V phase and the W phase also change similarly to the output current of the U phase.

Referring to FIG. 18, when the carrier frequency is low, the amplitude of a harmonic component (ripple current) included in the output current of the U phase is large as shown by a waveform WV1. In contrast, when the frequency of carrier wave W40 is heightened without changing the cycle of signal wave W41 in FIG. 17, the number of peaks of carrier wave W40 included in one cycle of signal wave W41 increases. In this case, as shown by a waveform WV2, the harmonic component becomes small and the waveform of the output current approaches the sinusoidal wave. It is to be noted that waveforms WV1 and WV2 shown in FIG. 18 are actual waveforms schematically shown for the sake of description.

When the waveform of the output current of the inverter, i.e., the motor current of the motor generator is WV1, the eddy current at the stator due to the high-frequency current increases as compared with the case where the waveform is WV2. As a result, a total amount of heat generated at the motor generator, including the temperature of the permanent magnet provided at the rotor, can be relatively increased. Therefore, it is understood that the magnet temperature can be actively raised by reducing the carrier frequency.

Figure 19:
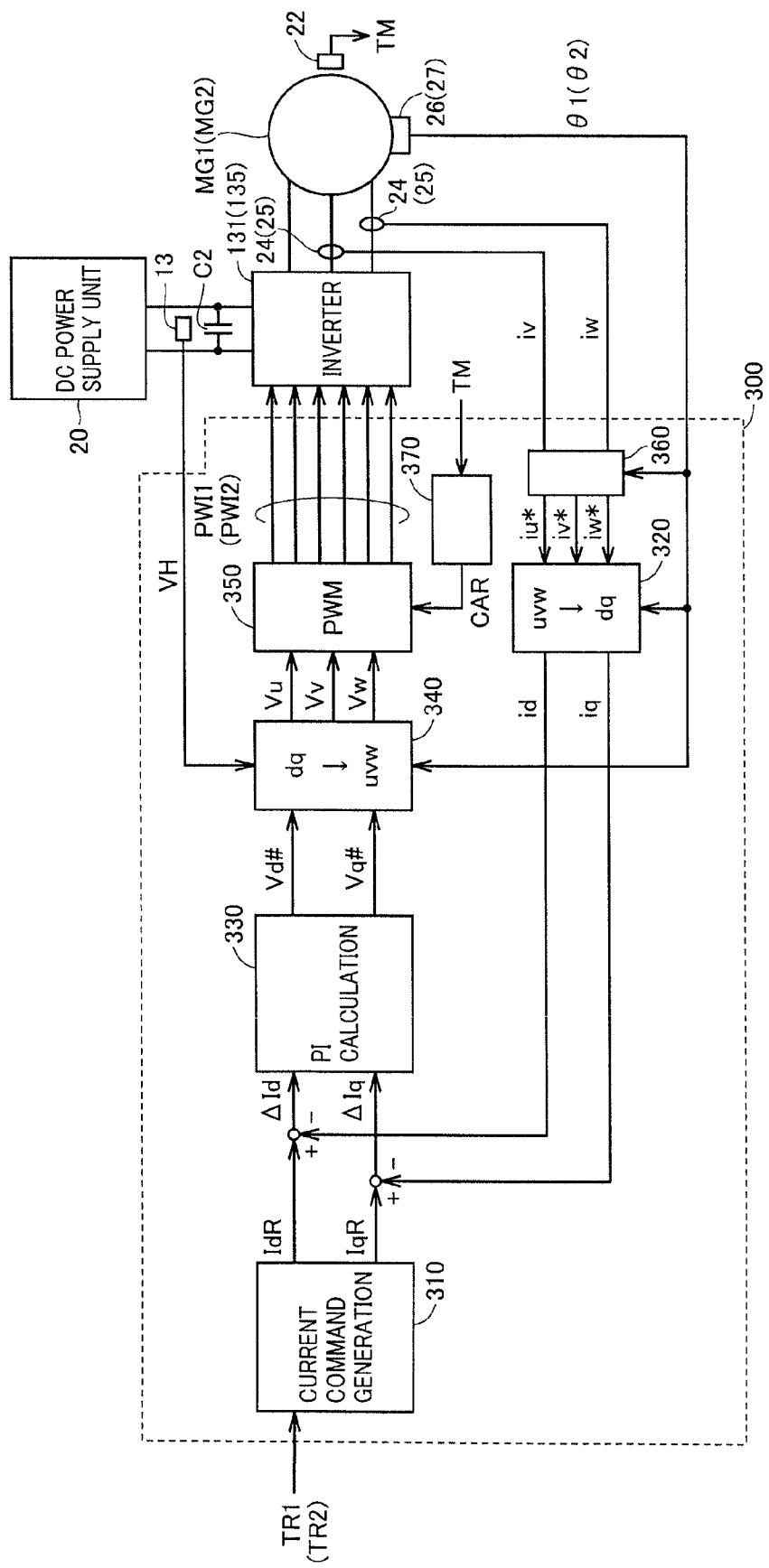
FIG. 19 is a control block diagram for describing a motor control configuration in the ECU of the vehicle in a third embodiment.

FIG. 19 is a control block diagram for describing a motor control configuration in ECU 300 of the vehicle in the third embodiment. The control block diagram in FIG. 19 is different from the control block diagram in the first embodiment shown in FIG. 2 in that a temperature sensor 22 for detecting the temperature of motor generator MG1 and a carrier setting unit 370 are added. Description of elements overlapping with the elements in FIG. 2 will not be repeated in FIG. 19.

Referring to FIG. 19, temperature sensor 22 detects the temperature of motor generator MG1 and outputs a detected value TM to ECU 300. Temperature sensor 22 is attached to, for example, a portion inside the coil of the stator or the casing of motor generator MG1. Since ECU 300 can estimate the temperature of the permanent magnet of the motor generator based on motor temperature TM detected by temperature sensor 22, motor temperature TM is used as a value representative of the temperature of the permanent magnet in the third embodiment.

Carrier setting unit 370 receives motor temperature TM detected by temperature sensor 22. Then, carrier setting unit 370 sets a carrier frequency corresponding to motor temperature TM, and outputs a carrier wave CAR of the carrier frequency to PWM signal generation unit 350.

PWM signal generation unit 350 generates switching control signal PWI1 of inverter 131 based on comparison between voltage command values Vu, Vv and Vw of the respective phases and carrier wave CAR provided from carrier setting unit 370.

Figure 20:
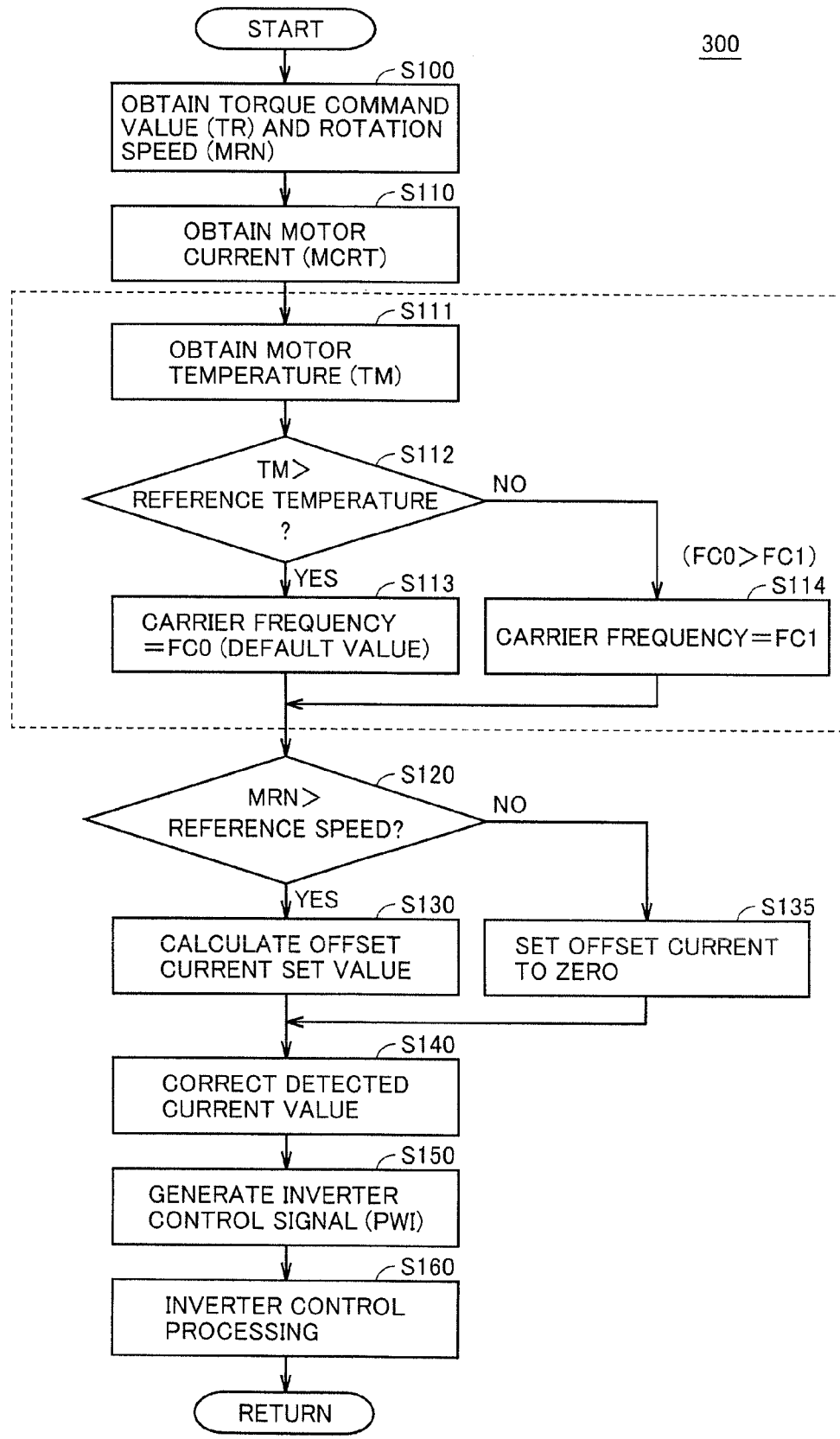
FIG. 20 is a flowchart for describing details of a current correction control process executed by the ECU in the third embodiment.

FIG. 20 is a flowchart for describing details of a current correction control process executed by ECU 300 in the third embodiment. The flowchart in FIG. 20 is different from the flowchart in the first embodiment shown in FIG. 11 in that steps S111 to S114 are added. Description of steps overlapping with the steps in FIG. 11 will not be repeated in FIG. 20.

Referring to FIG. 20, in S110, ECU 300 obtains the motor current. Then, the process proceeds to S111 and ECU 300 obtains motor temperature TM from temperature sensor 22.

In S112, ECU 300 determines whether or not obtained motor temperature TM is higher than a prescribed reference temperature.

If motor temperature TM is higher than the reference temperature (YES in S112), the process proceeds to S113 and ECU 300 sets the carrier frequency of carrier wave CAR to FC0, which is a default value.

On the other hand, if motor temperature TM is equal to or lower than the reference temperature (NO in S112), the process proceeds to S114 and ECU 300 sets the carrier frequency of carrier wave CAR to FC1 lower than the default value.

Thereafter, ECU 300 proceeds with the process in S120 and the subsequent steps similarly to FIG. 11. In S150, ECU 300 generates control signals PWI1 and PWI2 using carrier wave CAR having the carrier frequency set in S113 or S114 based on motor temperature TM.

With the control in accordance with the above-mentioned process, when the temperature of the motor generator is low, the temperature of the motor generator can be raised by reducing the carrier frequency, in addition to raising the temperature of the permanent magnet by superimposing the offset current on the current supplied to the motor generator. As a result, the temperature of the motor generator can be raised in a shorter time, and thus, an increase in the counter-electromotive voltage of the motor generator at the time of low temperature can be suppressed.

However, continuous use of the carrier wave having the reduced carrier frequency may lead to a sharp increase in the temperature of the permanent magnet, which may cause a reduction in the magnetic force. Therefore, it is preferable to manage, for example, the motor temperature, the time period during which a reduction in the carrier frequency continues, and the like and to suppress the reduction in the magnetic force.

Although the carrier frequency is set by switching two carrier frequencies based on whether or not the motor temperature is higher than the reference temperature in the flowchart in FIG. 20, the number of the carrier frequencies is not limited thereto. Two or more reference temperatures may be provided and the carrier frequencies may be set in smaller segments in accordance with motor temperature TM. Furthermore, using a predetermined map and calculation equation, the carrier frequency may be continuously changed in accordance with motor temperature TM.

Although description has been given in the above to the configuration in which the temperature sensor is provided to detect the actual temperature of the motor generator, the carrier frequency may be set based on the predicted temperature of the permanent magnet without using the temperature sensor as in the second embodiment.

Furthermore, the third embodiment is also applicable to the modification of the first embodiment and the second embodiment described above.

"Motor generators MG1 and MG2" in the present embodiments are one example of "AC motor" in the present invention. "Inverters 131 and 135" in the present embodiments are one example of "power conversion device" in the present invention.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

Reference Signs List 10, 13 voltage sensor; 11, 22 temperature sensor; 12, 24, 25 current sensor; 20 DC power supply unit; 26, 27 rotation angle sensor; 30 load device; 100 vehicle; 110 power storage device; 120 converter; 130, 131, 135 inverter; 132 U-phase upper and lower arms; 133 V-phase upper and lower arms; 134 W-phase upper and lower arms; 140 power split device; 150 engine; 160 driving wheel; 300 ECU; 310 current command generation unit; 320, 321, 340 coordinate conversion unit; 330 PI calculation unit; 350 PWM signal generation unit; 360, 361 correction unit; 370 carrier setting unit; C1, C2 capacitor; D1 to D8 diode; L1 reactor; MG1, MG2 motor generator; NL ground line; PL1, PL2 power line; Q1 to Q8 switching element; SR1, SR2 system relay

The invention claimed is:

1. A motor drive apparatus for driving an AC motor using electric power provided from a DC power supply,
   said AC motor being configured to rotate a rotor provided with a permanent magnet using a current magnetic field generated by passing a drive current through a coil of a stator,
   said motor drive apparatus comprising:
   a power conversion device configured to convert DC electric power provided from said DC power supply into AC electric power for driving said AC motor; and
   a control device for controlling said power conversion device such that an offset current is superimposed on at least one phase of said coil and a temperature of said permanent magnet is raised.

2. The motor drive apparatus according to claim 1, wherein said control device changes magnitude of said offset current in accordance with a rotation speed of said AC motor.

3. The motor drive apparatus according to claim 2, wherein said control device controls said power conversion device such that said offset current increases as said rotation speed becomes higher.

4. The motor drive apparatus according to claim 3, wherein said control device sets the magnitude of said offset current in proportional to said rotation speed.

5. The motor drive apparatus according to claim 3, wherein said control device increases said offset current in a stepwise manner as said rotation speed increases.

6. The motor drive apparatus according to claim 3, wherein said control device sets the magnitude of said offset current using a map predetermined based on said rotation speed.

7. The motor drive apparatus according to claim 2, wherein said control device stops superimposition of said offset current when said rotation speed is lower than a reference rotation speed.

8. The motor drive apparatus according to claim 7, wherein said control device executes superimposition of said offset current when a temperature related to said permanent magnet is lower than a reference value at the start of driving of said AC motor, and does not execute superimposition of said offset current when the temperature related to said permanent magnet is higher than said reference value.

9. The motor drive apparatus according to claim 1, wherein said control device has a map defining a temporal change in temperature rise of said permanent magnet based on a driving state of said AC motor, estimates the temperature of said permanent magnet by calculating a value of the temperature rise of said permanent magnet using said map based on a torque command value and a rotation speed of said AC motor, and summing the calculated values of the temperature rise in a time axis direction since the start of driving of said AC motor, and stops superimposition of said offset current when the estimated temperature of said permanent magnet reaches a threshold value.

10. The motor drive apparatus according to claim 1, wherein
said power conversion device includes an inverter configured to include a switching element and making power conversion by controlling said switching element in accordance with pulse width modulation control, and
said control device sets a frequency of a carrier wave used in said pulse width modulation control to be relatively lower when the temperature of said permanent magnet is lower than a reference temperature than when the temperature of said permanent magnet is higher than said reference temperature.

11. A vehicle, comprising:
a DC power supply;
an AC motor configured to rotate a rotor provided with a permanent magnet using a current magnetic field generated by passing a drive current through a coil of a stator and to generate driving force for causing said vehicle to run;
a power conversion device configured to convert electric power provided from said DC power supply into AC electric power for driving said AC motor; and
a control device for controlling said power conversion device such that an offset current is superimposed on at least one phase of said coil and a temperature of said permanent magnet is raised.

* * * * *